(12) United States Patent
Zhang et al.

(10) Patent No.: US 12,148,182 B2
(45) Date of Patent: Nov. 19, 2024

(54) METHOD, APPARATUS, ELECTRONIC DEVICE AND STORAGE MEDIUM FOR ESTIMATING OBJECT POSE

(71) Applicant: Samsung Electronics Co., Ltd., Suwon-si (KR)

(72) Inventors: Chao Zhang, Beijing (CN); Jiyeon Kim, Hwaseong-si (KR); Yang Liu, Beijing (CN); Yueying Kao, Beijing (CN); Hao Wang, Beijing (CN); Hyun Sung Chang, Seoul (KR); Qiang Wang, Beijing (CN); Sunghoon Hong, Hwaseong-si (KR); Weiming Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 17/476,920

(22) Filed: Sep. 16, 2021

(65) Prior Publication Data
US 2022/0101555 A1    Mar. 31, 2022

(30) Foreign Application Priority Data

Sep. 29, 2020  (CN) .......................... 202011050187.8
Jun. 24, 2021  (KR) ........................ 10-2021-0082024

(51) Int. Cl.
*G06T 17/00*    (2006.01)
*G06T 7/11*    (2017.01)
(Continued)

(52) U.S. Cl.
CPC .................. *G06T 7/74* (2017.01); *G06T 7/11* (2017.01); *G06T 7/20* (2013.01); *G06T 7/60* (2013.01);
(Continued)

(58) Field of Classification Search
CPC . G06T 7/50–7/596; G06T 2207/10028; G06T 2207/20221; G06V 10/80–10/817
See application file for complete search history.

(56) References Cited

U.S. PATENT DOCUMENTS 9,875,545 B2 *  1/2018  Rhee ...................... G06T 7/337
10,331,974 B2  6/2019  Zia et al.
(Continued)

FOREIGN PATENT DOCUMENTS

JP    2019-87229 A    6/2019
KR    10-1854048 B1    5/2018
(Continued)

OTHER PUBLICATIONS

Rim et al., "Real-time Human Pose Estimation using RGB-D images and Deep Learning", Journal of Internet Computing and Services(JICS) 2020. Jun.: 21(3): pp. 113-121. (Year: 2020).*

(Continued)

*Primary Examiner* — Brian Werner
(74) *Attorney, Agent, or Firm* — NSIP Law

(57) ABSTRACT

A method, an apparatus, an electronic device for estimating a pose of an object include determining a confidence of a depth image of an object based on a color image and the depth image of the object, estimating a pose of the object based on a three-dimensional (3D) keypoint in response to the depth image being reliable, and estimating the pose of the object based on a two-dimensional (2D) keypoint in response to the depth image being unreliable.

19 Claims, 14 Drawing Sheets

(51) Int. Cl.
 *G06T 7/20* (2017.01)
 *G06T 7/60* (2017.01)
 *G06T 7/73* (2017.01)

(52) U.S. Cl.
 CPC ............... *G06T 2207/10016* (2013.01); *G06T 2207/10024* (2013.01); *G06T 2207/10028* (2013.01); *G06T 2207/20221* (2013.01)

(56) References Cited

U.S. PATENT DOCUMENTS

| | | |
|---|---|---|
| 10,452,960 B1 | 10/2019 | Li et al. |
| 2019/0188533 A1 | 6/2019 | Katabi et al. |
| 2019/0278983 A1 | 9/2019 | Iqbal et al. |
| 2020/0097732 A1 | 3/2020 | Doolittle et al. |

FOREIGN PATENT DOCUMENTS

| | | |
|---|---|---|
| KR | 10-2019-0030474 A | 3/2019 |
| KR | 10-2020-0045896 A | 5/2020 |

OTHER PUBLICATIONS

Huang, Siyuan, et al., "Cooperative Holistic Scene Understanding: Unifying 3D Object, Layout, and Camera Pose Estimation," 32nd Conference on Neural Information Processing Systems (NIPS 2018), Montréal, Canada, *arXiv preprint arXiv:1810.13049*, 2018 (pp. 1-12).

Wang, Chen, et al. "DenseFusion: 6D Object Pose Estimation by Iterative Dense Fusion," *Proceedings of the IEEE/CVF conference on computer vision and pattern recognition*, Jan. 15, 2019 (pp. 1-11).

He, Yisheng, et al., "PVN3D: A Deep Point-wise 3D Keypoints Voting Network for 6DOF Pose Estimation," *Proceedings of the IEEE/CVF conference on computer vision and pattern recognition*, 2020 (pp. 11632-11641).

\* cited by examiner

METHOD, APPARATUS, ELECTRONIC DEVICE AND STORAGE MEDIUM FOR ESTIMATING OBJECT POSE

CROSS-REFERENCE TO RELATED APPLICATIONS

This application claims the benefit under 35 USC 119(a) of Chinese Patent Application No. 202011050187.8, filed on Sep. 29, 2020, in the China National Intellectual Property Administration and Korean Patent Application No. 10-2021-0082024, filed on Jun. 24, 2021, in the Korean Intellectual Property Office, the entire disclosures of which are incorporated herein by reference for all purposes.

BACKGROUND

Field

The following description relates to an artificial intelligence (AI) and augmented reality (AR) technology for estimating a pose of an object.

Description of Related Art

With the developments in information technology and artificial intelligence, there is an increasing demand for automation and technologies for virtual reality, autonomous driving, and robotics. Object pose estimation technology may estimate pose information of a camera about an object and may construct a spatial shape around the object based on the corresponding pose information. Therefore, the object pose estimation technology plays an important role in technologies, such as, for example, virtual reality, autonomous driving, and augmented reality.

Object pose estimation is generally performed based on a color image. However, this method is limited in implementing accuracy of results in a complex application and thus, may not achieve accuracy required for an actual application.

Although a conventional object pose estimation method may estimate a pose of an object based on a depth image and a color image, an inaccurate pose of the object may be estimated based on quality of the depth image. Accuracy of an object pose that is acquired such that depth data is missing or an error and noise are present may not be high.

Also, when estimating a 6D pose of an object based on a color image and a depth image, the conventional object pose estimation method processes each of the color image and the depth image using heterogeneous reception, extracts a feature using a fusion network, and estimates a pose based on the extracted feature. However, the conventional object pose estimation method uses only a feature of a single object and does not readily perform an accurate object pose estimation when images overlap or shadow appears in the object.

Also, when estimating a pose of an object by fusing a color feature and a depth feature, a large amount of memory and resources need to be used and the efficiency of accurate pose estimation is low. Therefore, real-time requirements of object pose estimation may not be met.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object pose estimation method, the method including determining a confidence of a depth image of an object based on a color image and the depth image of the object, estimating a pose of the object based on a three-dimensional (3D) keypoint in response to the depth image being reliable, and estimating the pose of the object based on a two-dimensional (2D) keypoint in response to the depth image being unreliable.

The determining of the confidence of the depth image may include extracting an image feature based on the color image or based on the color image and the depth image, extracting a point cloud feature based on the depth image, acquiring a fusion feature by fusing the image feature and the point cloud feature, and determining the confidence of the depth image based on the fusion feature.

The determining of the confidence of the depth image based on the fusion feature may include acquiring an object instance segmentation image and a depth confidence image based on the fusion feature, and determining the confidence of the depth image corresponding to each target object in the color image based on the object instance segmentation image and the depth confidence image.

The determining of the confidence of the depth image may include extracting an image feature based on the color image and the depth image and determining the confidence of the depth image based on the image feature.

The determining of the confidence of the depth image based on the image feature may include acquiring an object instance segmentation image and a depth confidence image based on the image feature, and determining the confidence of the depth image corresponding to each target object in the color image based on the object instance segmentation image and the depth confidence image.

The acquiring of the object instance segmentation image and the depth confidence image based on the image feature may include acquiring a region image feature of an image region corresponding to the each target object based on the image feature, and determining a depth confidence image of a target object based on a region image feature corresponding to the target object and acquiring the object instance segmentation image based on the region image feature corresponding to the each target object.

The method may include acquiring a first appearance feature of each target object and a geometric relationship feature between the respective target objects based on the color image and the depth image, and determining a second appearance feature of a target object based on a first appearance feature of the target object, a first appearance feature of another target object, and a geometric relationship feature between the target object and the other target object, with respect to the each target object.

The estimating of the pose of the object based on the 3D keypoint may include estimating a pose of the each target object based on a fusion feature and a second appearance feature of the each target object.

The estimating of the pose of the object based on the 3D keypoint may include estimating a pose of the each target object based on an image feature and a second appearance feature of the each target object.

The acquiring of the first appearance feature of the each target object and the geometric relationship feature between the respective target objects based on the color image and the depth image may include extracting an image feature based on the color image or based on the color image and the depth image, extracting a point cloud feature based on the depth image, acquiring a fusion feature by fusing the image feature and the point cloud feature, acquiring the first appearance feature of the each target object and an object instance segmentation image based on the fusion feature, and acquiring a geometric relationship feature between the respective target objects based on the object instance segmentation image.

The acquiring of the first appearance feature of the each target object and the geometric relationship feature between the respective target objects based on the color image and the depth image may include extracting an image feature based on the color image and the depth image, acquiring a region image feature corresponding to an image region of the each target object based on the image feature, acquiring the first appearance feature of the each target object and a corresponding object detection result based on the region image feature corresponding to the image region of the each target object, and acquiring the geometric relationship feature between the respective target objects based on the object detection result of each target object.

The method may include detecting whether a target object or a target pose first appears in a video frame and determining whether the video frame is an initial frame.

The detecting of whether the target object or the target pose first appears in the video frame and the determining of whether the video frame is the initial frame may include acquiring an image bounding box of each target object in a corresponding video frame, matching the image bounding box of each target object and an image bounding box corresponding to each object of a pose result list, in response to a matching target object being present in the pose result list, comparing first point cloud data of the image bounding box corresponding to each target object in the corresponding video frame and a second point cloud data frame corresponding to each target object in a previous video frame of the corresponding video frame and determining whether a difference is present between the first point cloud data and second point cloud data, and determining that a pose of an object corresponding to the target object first appears, in response to the difference being present, and determining that the target object first appears, in response to the matching target object being absent in the pose result list.

The method may include acquiring a motion parameter corresponding to the video frame and determining a pose result corresponding to the video frame based on the motion parameter and an object pose result of an initial frame corresponding to the video frame, in response to the video frame being a non-initial frame, and updating the object pose result of the initial frame corresponding to the video frame in a pose result list based on the pose result corresponding to the video frame.

In another general aspect, there is provided an object pose estimation apparatus including an image confidence determiner configured to determine a confidence of a depth image of an object based on a color image and the depth image of the object, and a pose estimator configured to estimate a pose of the object based on a three-dimensional (3D) keypoint in response to the depth image being reliable, and to estimate the pose of the object based on a two-dimensional (2D) keypoint in response to the depth image being unreliable.

In another general aspect, there is provided an electronic device including a processor configured to determine a confidence of a depth image of an object based on a color image and the depth image of the object, estimate a pose of the object based on a three-dimensional (3D) keypoint in response to the depth image being reliable, and estimate the pose of the object based on a two-dimensional (2D) keypoint in response to the depth image being unreliable.

The processor may be configured to extract an image feature based on the color image or based on the color image and the depth image, extract a point cloud feature based on the depth image, acquire a fusion feature by fusing the image feature and the point cloud feature, and determine the confidence of the depth image based on the fusion feature.

The processor may be configured to acquire an object instance segmentation image and a depth confidence image based on the fusion feature, and determine the confidence of the depth image corresponding to each target object in the color image based on the object instance segmentation image and the depth confidence image.

The processor may be configured to detect whether a target object or a target pose first appears in a video frame and to determine whether the video frame is an initial frame.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
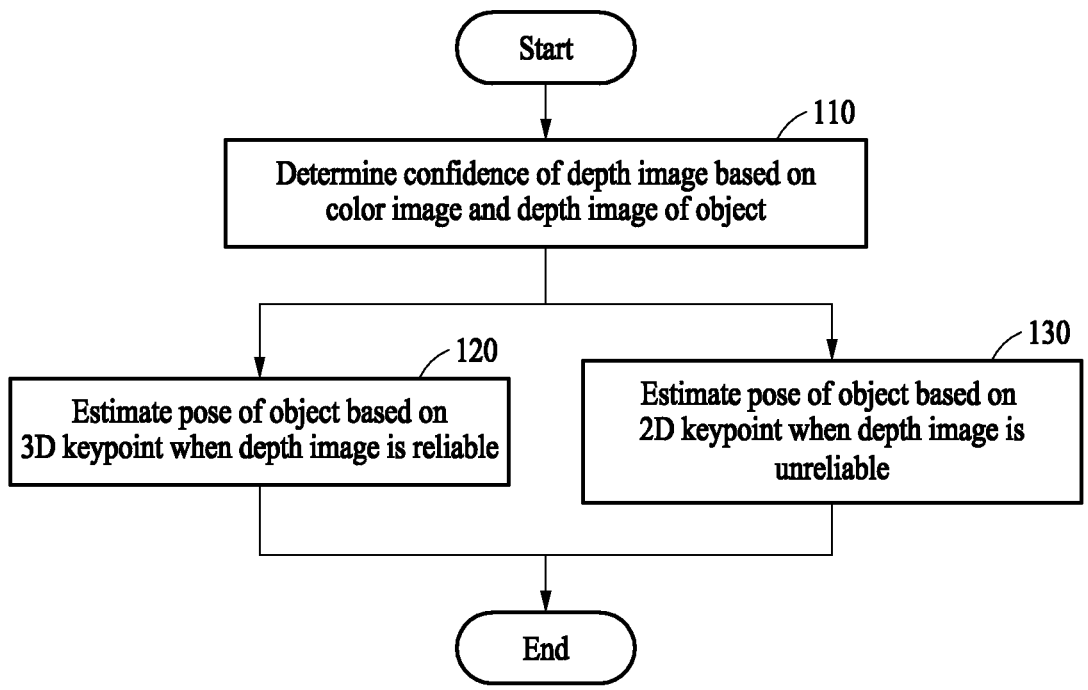
FIG. 1 illustrates an example of a process of estimating a pose of an object.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," A, B, (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

In an example, an may have 6 degrees of freedom (DOF) in space, and is also referred to as a 6-DOF object, such as, for example, a cup, a monitor, and a book.

In an example, augmented reality (AR) technology adds virtual content to a display scene in front of a user and provides real information experience to the user. To complete high-quality virtual reality (VR) fusion effect in front of the user, an AR system requires high precision real-time processing and understanding about a three-dimensional (3D) state of a surrounding object.

In an example, pose estimation expresses a structure and a shape of an object using a geometric model or structure, extracts features of the object, establishes a correspondence relationship between a model and an image, and estimates a spatial pose of the object using a geometric method or another method. In an example, the model used herein may be a simple geometric body, such as, for example, a plane, a cylinder, or any type of geometric structures, and may be a 3D model acquired through laser scanning or other methods.

In an example, 6D pose estimation of an image may estimate a 6D pose of a target object present in a given single image including color and depth information. The 6D pose may include a 3D position and a 3D spatial orientation, and is also referred to as a 6-DOF pose.

In an example, a multi-layer perceptron (MLP) network is a multi-layer neural network and an artificial neural network in a forward structure.

In an example, semantic segmentation refers to separating a target object from a background.

In an example, object detection refers to determining a position of an object in an image.

In an example, instance segmentation refers to determining a pixel that belongs to each target object.

In an example, disclosed is an object pose estimation method that may outperform at least one of the aforementioned issues and may effectively improve accuracy of object pose estimation when estimating a pose of an object based on a color image and a depth image and may not depend on reliable quality of the depth image.

FIG. 1 illustrates an example of a process of estimating a pose of an object.

Referring to FIG. 1, in operation 110, an object pose estimation apparatus determines a confidence of a depth image of an object based on a color image and the depth image of the object.

In operation 120, when the depth image is reliable, the object pose estimation apparatus estimates the pose of the object based on a 3D keypoint.

In operation 130, when the depth image is unreliable, the object pose estimation apparatus estimates the pose of the object based on a two-dimensional (2D) keypoint.

Here, the color image and the depth image refer to images that include the same object in a situation corresponding to the same scene and a type of an object and a number of objects are not limited. The examples do not limit a method of acquiring a depth image corresponding to a color image. For example, the color image and the depth image may be simultaneously acquired through a general image acquisition apparatus and depth image acquisition apparatus, and may also be acquired through an image acquisition apparatus or a video acquisition apparatus having all of depth image and color image acquisition functions. For example, a Red+Green+Blue+depth (RGBD) image, i.e., an image including three primary colors red/green/blue and depth information, may be acquired through the image acquisition apparatus and the depth image and the color image may be acquired based on the corresponding RGBD image.

For a color image, the object pose estimation apparatus may configure and select whether to use a gray image or a color image according to actual application requirements. For example, the object pose estimation apparatus may use the color image to achieve better pose estimation effect and may use the gray image to improve efficiency of pose estimation. For clarity of description, the following description is made using the color image as an example.

Continuous and real-time object pose estimation is required in many application scenes. Optionally, an RGBD video of an object may be collected through video acquisition equipment, each frame image of a corresponding video may be an RGBD image, a color image and a depth image may be extracted and acquired in the same video frame, and all corresponding color and depth images may be acquired for each video frame. Objects of a color image and a depth image corresponding to the same video frame may match and at least one object may be present. With respect to the acquired color image and depth image corresponding to each video frame, real-time object pose estimation may be implemented based on the method provided herein.

The object pose estimation apparatus may extract and process an image feature based on a color image and a depth image and may determine confidence of the depth image using the processed image feature. In an example, determining confidence of the depth image may refer to determining confidence of depth data of the depth image. In an example, the depth image includes a variety of data, for example, depth data and contour data, and determining the confidence of the depth image may refer to determining whether depth data of the depth image is reliable.

The confidence of the depth image may be determined by setting a confidence threshold or by setting a ratio threshold of a confidence pixel. If confidence corresponding to the depth image exceeds the set confidence threshold or if a statistically reliable ratio of pixels exceeds the set ratio threshold, it represents that the corresponding depth image is reliable.

When the depth image is reliable, the object pose estimation apparatus estimates a pose of the object based on a 3D keypoint. When the depth image is unreliable, the object pose estimation apparatus estimates the pose of the object based on a 2D keypoint.

In an example, the 2D keypoint may be acquired based on only the color image. In an example, among network structures described herein, an MLP network in which an input is in a form of a point cloud feature is replaced with a convolutional neural network (CNN) in which an input is in a form of an image feature for 2D keypoint extraction. Also, all of the 2D keypoint and the 3D keypoint may be acquired based on the depth image and the color image.

When the depth image is reliable, the object pose estimation apparatus estimates the pose of the object based on the 3D keypoint. In an example, the object pose estimation apparatus may acquire the 3D keypoint based on the depth image and the color image and may estimate the pose of the object using the acquired 3D keypoint. Data of the corresponding 3D keypoint includes depth data provided from the depth image. Compared to a method of using only the color image for object pose estimation, the object pose estimation apparatus provided herein estimates an object pose based on the color image and the depth image, which increases a size of basic data and helps to improve accuracy and precision of object pose estimation. Also, an accurate object pose may be acquired under conditions such as object occlusion, sensor noise, and insufficient lighting.

When the depth image is unreliable, the object pose estimation apparatus estimates the pose of the object based on the 2D keypoint. In an example, the object pose estimation apparatus acquires the 2D keypoint of the image based on contour data of the depth image and the color image and estimates the pose using the acquired 2D keypoint. Depth data of the depth image is unreliable. Therefore, in this case, in the case of estimating an object pose based on the depth data, an error may occur in a finally acquired object pose. Accordingly, when the depth image is unreliable, the object pose estimation apparatus may estimate the pose based on object contour data of the depth image and the color image without depending on integrity of depth data of the depth image. Accordingly, when the depth data is missing or when an error and noise is present, pose estimation based on the color image and object contour data may improve accuracy of the estimated object pose compared to the object pose estimation method based on only the color image.

Herein, the object pose estimation apparatus estimates a pose of an object based on the depth image and the color image. First, the object pose estimation apparatus determines confidence of the depth image based on the color image and the depth image. When the depth image is reliable, the object pose estimation apparatus may estimate the pose of the object based on the 3D keypoint. When the depth image is unreliable, that is, when the depth data is missing or when an error and noise is present, the object pose estimation apparatus may estimate the pose of the object based on the 2D keypoint, thereby reducing complete dependency on the depth image and increasing accuracy of object pose estimation. Also, the object pose estimation apparatus may improve robustness of object pose estimation by performing the object pose estimation through an adaptive selection on the depth image or the color image based on a result of determining confidence of the depth image.

In an example, determining confidence of a depth image of an object based on a color image and the depth image of the object may be performed through one of the following method A and method B.

The method A may include the following operations. Extracting an image feature based on a color image or the color image and a depth image. Extracting a point cloud feature based on the depth image. Acquiring a fusion feature by fusing the image feature and the point cloud feature. Determining confidence of the depth image based on the fusion feature.

The operations of method A may be performed in the sequence and manner as shown, although the order of some operations may be changed or some of the operations omitted without departing from the spirit and scope of the illustrative examples described. Many of the operations may be performed in parallel or concurrently.

The method A provided herein may extract the image feature based on the color image and may also extract the image feature based on the color image and the depth image. Here, extraction of the image feature may be performed through, for example, an image feature extraction network and an image feature extraction algorithm. In a subsequent operation of the method A, the image feature and the point cloud feature are fused. Therefore, in a situation in which the image feature is extracted based on only the color image, the fused feature includes contour data and depth data of the depth image.

Figure 2:
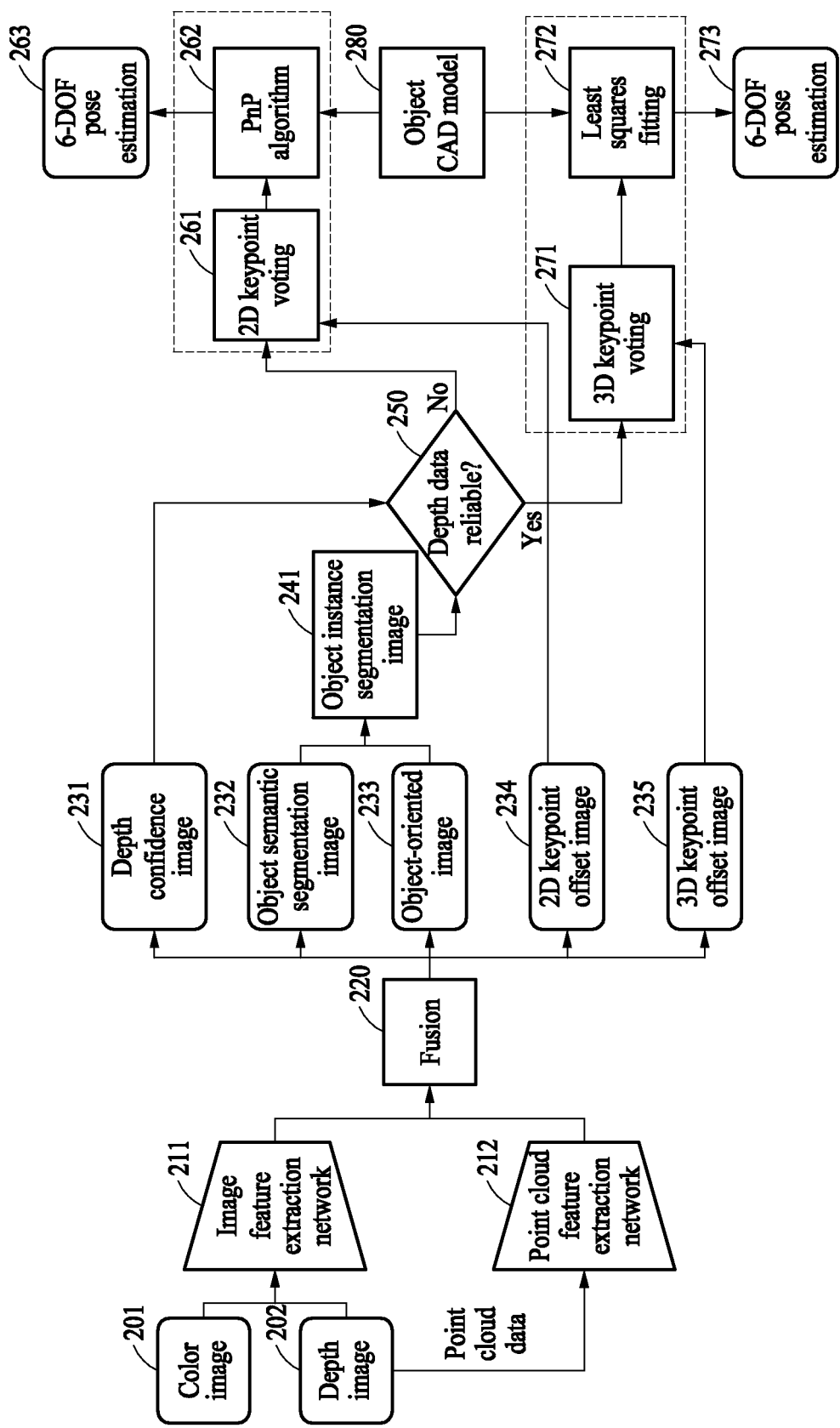
FIG. 2 illustrates an example of a process of estimating a pose of an object based on a one time of feature extraction.

The method A provided in an optional example is illustrated in FIG. 2. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

The method A extracts a feature based on the color image and the depth image and extracts the image feature through the image feature extraction network. That is, the method A inputs the color image and the depth image to the image feature extraction network. In the case of the color image, an input of the image feature extraction network may be four channel images of H*W acquired by pixel-by-pixel splicing the color image and the depth image. Here, H denotes a height of a corresponding image, W denotes a width of the image, four channels include three channels corresponding to RGB data of the color image and a channel corresponding to depth data of the depth image. In an example, and an output of the image feature extraction network includes an image feature vector of each pixel.

The method A may optionally extract the point cloud feature based on the depth image. Initially, the method A may acquire point cloud data corresponding to the depth image by converting a point cloud for the depth image and then acquire the point cloud feature corresponding to the depth image by extracting the point cloud feature based on the point cloud data. Here, extraction of the point cloud feature may be performed through a point cloud feature extraction network. An input of the point cloud feature extraction network includes point cloud data and an output of the point cloud feature extraction network includes a point cloud feature vector of each 3D point. Through this, a point cloud feature vector of each pixel is acquired. In an example, the point cloud feature vector may be characterized as a geometric feature vector.

The method A acquires the fusion feature by fusing the acquired image feature and point cloud feature. In an example, the method A acquires the fusion feature by pixel-by-pixel fusing the image feature vector of each pixel acquired through image feature extraction and the point cloud feature vector of each pixel acquired through point cloud feature extraction, for each pixel included in the corresponding image.

Optionally, a fusion task may be a high-density fusion and may include splicing the image feature vector and the point cloud feature vector or projecting the image feature vector and/or the point cloud feature vector onto another feature space and may use a feature vector of a corresponding feature space as a fusion feature of a corresponding pixel. In an example, the fusion task may filter out interference information of an image and may reduce information duplication of the fusion feature through the fusion method of projecting the image feature vector and/or the point cloud feature vector onto the other feature space.

Compared to the method of determining confidence of the depth image based on only the color image, the method A of determining the confidence of the depth image based on the fusion feature provides an accurate determination result and assists to increase the efficiency of determining the confidence of the depth image.

In an example, a process of determining the confidence of the depth image based on the corresponding fusion feature is as follows. A depth confidence image including depth data of each pixel is acquired based on the fusion feature and whether the depth image is reliable is determined based on depth data of each pixel of the depth confidence image and a preset confidence threshold or ratio threshold.

The method B may include extracting an image feature based on a color image and a depth image, and determining confidence of the depth image based on the image feature.

Figure 3:
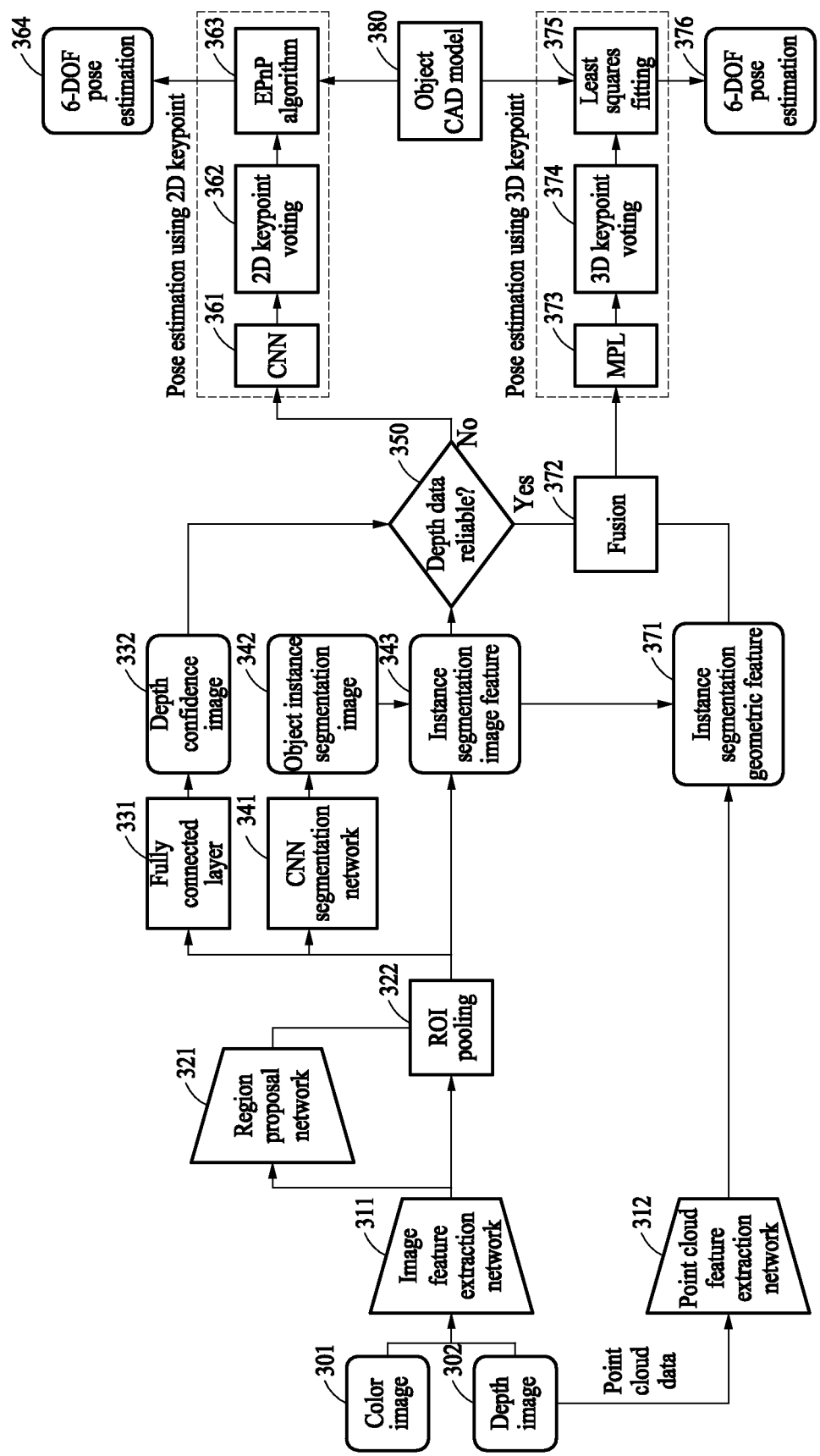
FIG. 3 illustrates an example of a process of estimating a pose of an object based on two times of feature extraction.

An example of method B is illustrated in FIG. 3 and further description related to each operation of FIG. 3 is made below. The method B extracts features of the color image and the depth image using an image feature extraction network and acquires the image feature. When at least two target objects are present in an image, the method B performs a region segmentation on an image region of an expected target object and acquires an image region, for example, a region of interest (ROI), of each target object. The method B acquires an image feature of the corresponding image region by performing a pooling process on the image region and acquires a depth confidence image corresponding to the target object based on the pooled image feature. The method B determines confidence of image data by comparing the depth confidence image corresponding to the target object to a confidence threshold or ratio threshold.

In an example, the confidence of the depth image is determined based on a fusion feature, which may be performed through a method that includes the operations of acquiring an object instance segmentation image and a depth confidence image based on a fusion feature, and determining the confidence of the depth image corresponding to each target object in the color image based on the object instance segmentation image and the depth confidence image.

Referring to FIG. 2, the object pose estimation apparatus may acquire a fusion feature of an image feature and a point cloud feature and predict confidence of a depth image based on the fusion feature and may determine a depth confidence image corresponding to an image. Also, the object pose estimation apparatus may segment an object instance by performing semantic segmentation and central offset estimation based on the fusion feature and may acquire an object instance segmentation image. The object pose estimation apparatus determines the confidence of the depth image corresponding to each target object in the color image based on the object instance segmentation image and the depth confidence image.

In an example, the object pose estimation apparatus may acquire a pixel of an image region corresponding to each target object based on the object instance segmentation image and may acquire depth data of each pixel of the corresponding image region based on the depth confidence image. That is, the object pose estimation apparatus may acquire the depth image corresponding to each target object. The object pose estimation apparatus may determine the confidence of the depth image corresponding to each target object based on a confidence threshold or ratio threshold. In detail, if depth data of a depth image of an arbitrary target object exceeds a threshold or if a statistically reliable pixel ratio is greater than the threshold, the object pose estimation apparatus may determine that the depth image of the corresponding target object is reliable. Otherwise, the object pose estimation apparatus may determine that the depth image of the corresponding target object is unreliable.

At least one target object may be present in an image. Therefore, when some target objects are reliable and some target objects are unreliable, a confidence result of each target object may not be acquired based on a confidence determination result of a depth image corresponding to an entire image. In this regard, the method proposed herein acquires an object instance segmentation image corresponding to each target object using the fusion feature, acquires a depth image corresponding to each target object, determines confidence of the depth image corresponding to each target object by combining the confidence threshold therewith, and determines confidence of each target object in the image.

In an example, determination of confidence of a depth image may be overall determination rather than separate determination about an object. That is, although at least one target object is present in the image, the entire image may be determined and a determination result may be acquired. When the determination result is reliable, the object pose estimation apparatus may estimate a pose of an object by applying a 3D keypoint-based pose estimation method to each target object. When the determination result is unreliable, the object pose estimation apparatus may estimate the pose of the object by applying a 2D keypoint- based pose estimation method to each target object. The corresponding method may decrease a data throughput in a confidence determination process and may improve determination efficiency.

In an example provided herein, the determining of the confidence of the depth image based on the image feature may include acquiring the object instance segmentation image and the depth confidence image based on the image feature, and determining the confidence of the depth image corresponding to each target object in the color image based on the object instance segmentation image and the depth confidence image.

Referring to FIG. 3, the object pose estimation apparatus acquires the image feature based on the color image and the depth image and performs segmentation processing on the image feature. The object pose estimation apparatus corresponding segmentation processing may be performed through a region proposal network and an image region that may belong to a target object may be extracted. The object pose estimation apparatus acquires an object instance segmentation image and a depth confidence image corresponding to a corresponding target object based on an image region of each target object, determines a depth image corresponding to the target object based on the object instance segmentation image and the depth confidence image, and determines confidence of the depth image corresponding to the target object based on a result of comparing depth data of each pixel of the depth image and a preset threshold.

The method provided in the corresponding example determines the confidence of the depth image corresponding to the target object based on the image feature, segments the target object based on the image feature, acquires the depth image corresponding to each target object, and decreases a data throughput for determining the confidence of the depth image.

In an example, the object pose estimation apparatus may acquire the object instance segmentation image and the depth confidence image based on the image feature, which may be implemented through the following method.

Acquiring a region image feature of an image region corresponding to each target object based on the image feature. Determine a depth confidence image of a corresponding target object based on a region image feature corresponding to the corresponding target object and acquiring the object instance segmentation image based on the region image feature corresponding to each target object, with respect to each target object.

Referring to FIG. 3, the object pose estimation apparatus may determine the image feature based on the color image and the depth image and may perform a segmentation processing on the image feature.

The object pose estimation apparatus may perform region segmentation on a target object through a region proposal network or a region segmentation algorithm and may acquire an image region corresponding to each target object. The object pose estimation apparatus may extract a feature based on the image region corresponding to each target object, may acquire a region image feature, and, through this, may segment an image in a target object layer. Here, the region image feature may be acquired through ROI pooling on the object image region.

The object pose estimation apparatus may process a corresponding region image feature through a fully connected layer of a neural network based on the region image feature corresponding to the corresponding target object, with respect to each target object. The object pose estimation apparatus may determine the depth confidence image corresponding to the corresponding target object and then may determine whether the depth confidence image is reliable by combining a threshold of depth data corresponding to the corresponding target object.

With respect to each target object, the object pose estimation apparatus may perform object instance segmentation on an image using a neural network, for example, a CNN, based on the region image feature corresponding to the corresponding target object, may acquire the object instance segmentation image, and may acquire contour information of the target object and details of an object in a contour through the object instance segmentation image.

Based thereon, the object pose estimation apparatus may determine a depth image corresponding to each target object based on the object instance segmentation image and the corresponding depth confidence image and may determine confidence for a depth image of a corresponding target object based on the corresponding depth image and a corresponding threshold.

The method provided herein may accomplish accurate segmentation of a target object by segmenting a region of the target object layer based on the image feature and by acquiring contour and details of the target object through neural network processing, which leads to an improvement in determining an accuracy of a confidence result that is used to acquire a depth image corresponding to the target object.

In the corresponding implementation method, the object pose estimation apparatus may additionally estimate a pose of an object based on the depth image or may estimate the pose of the object based on the color image, based on the object instance segmentation image and the region image feature corresponding to each target object. In an example, the method may include acquiring an image feature of each target object based on the object instance segmentation image and the corresponding region image feature of each target object. The pose of the object may be estimated based on the image feature of the corresponding target object, with respect to each target object.

Referring to FIG. 3, the object pose estimation apparatus may acquire an image feature corresponding to the target object by processing, for example, multiplying a segmented image of an object instance and a corresponding region image feature.

Acquiring a 2D keypoint offset image or a 3D keypoint offset image of an object based on the image feature of the target object by using the image feature of the corresponding target object as basic data of object pose estimation, for example, basic data of 2D keypoint- based object pose estimation or basic data of 3D keypoint-based object pose estimation, with respect to each target object may improve accuracy of the 2D keypoint offset image and the 3D keypoint offset image.

In operation 120 of FIG. 1, the object pose estimation apparatus estimates the pose of the object based on the 3D keypoint. Operation 120 may be performed in the following manner illustrated in FIG. 4.

Figure 4:
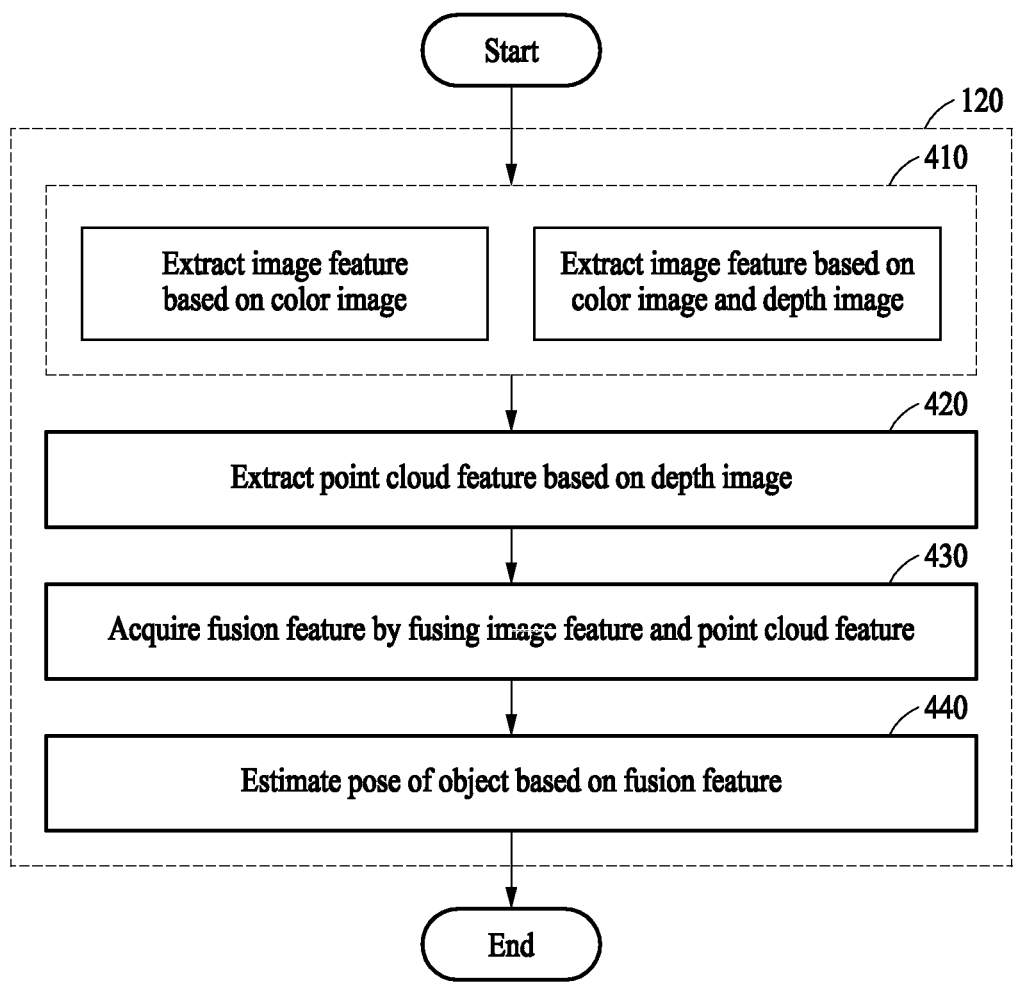
FIG. 4 illustrates an example of a process of estimating a pose of an object based on a depth image.

FIG. 4 illustrates an example of a process of estimating a pose of an object based on a depth image. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the object pose estimation apparatus extracts an image feature based on a color image, or the color image and a depth image.

In operation 420, the object pose estimation apparatus extracts a point cloud feature based on the depth image.

In operation 430, the object pose estimation apparatus acquires a fusion feature by fusing the image feature and the point cloud feature.

In operation 440, the object pose estimation apparatus estimates a pose of an object based on the fusion feature.

The method provided herein may extract the image feature based on the color image and may also extract the image feature based on the color image and the depth image. Here, extraction of the image feature may be performed through, for example, an image feature extraction network and an image feature extraction algorithm. Since fusion of the image feature and the point cloud feature is performed, the fused feature includes data, such as, for example, depth data of the depth image and contour data although the image feature is extracted based on only the color image.

The method illustrated in FIG. 2 extracts the image feature based on the color image and the depth image through the image feature extraction network. That is, the object pose estimation apparatus may extract the image feature by inputting the color image and the depth image to an image feature network. Here, an output of a feature extraction network includes an image feature vector of each pixel.

In another example, the object pose estimation apparatus extracts the point cloud feature based on the depth image. Initially, the object pose estimation apparatus acquires point cloud data corresponding to the depth image by converting a point cloud for the depth image and acquires the point cloud feature corresponding to the depth image by extracting the point cloud feature based on the point cloud data. The object pose estimation apparatus may extract the point cloud feature through the point cloud feature extraction network. Here, an input of the point cloud feature extraction network includes point cloud data and an output thereof includes a point cloud feature vector of each 3D point.

The object pose estimation apparatus acquires the fusion feature by fusing the acquired image feature and point cloud feature. In an example, with respect to each pixels included in an image, a fusion feature is acquired by fusing an image feature vector and a point cloud feature vector of a corresponding pixel. A fusion task may be a high-density fusion.

The object pose estimation apparatus may determine the confidence of the depth image based on the fusion feature. Determining the confidence of the depth image based on the fusion feature may achieve a further accurate determination result and may improve efficiency of acquiring the confidence of the depth image compared to a method of determining the confidence based on only the color image.

Acquiring the 2D keypoint offset image and the 3D keypoint offset image based on the fusion feature may refer to acquiring the 2D keypoint offset image and the 3D keypoint offset image through deep learning. The object pose estimation apparatus estimates the pose of the object based on a result of determining the confidence of the depth image, and estimates the pose of the object based on the 3D keypoint offset image when the depth image is reliable and estimates the pose of the object based on the 2D keypoint offset image when the depth image is unreliable.

Referring to FIG. 3, the object pose estimation apparatus acquires an instance segmentation image feature of a target object by performing segmentation processing on the target object using the image feature, acquires an instance segmentation point cloud feature by extracting a point cloud feature for the depth image, estimates the 3D keypoint offset image based on a fusion feature acquired by fusing the segmented image feature and point cloud feature, and estimates the pose of the object based on the 3D keypoint offset image.

Here, three channels of the 3D keypoint offset image represents a deviation vector from 3D coordinates of an object point corresponding to a corresponding pixel to 3D coordinates of a reference keypoint on the object.

In an example, estimating the pose of the object based on the 3D keypoint offset image may be performed through the following method. The object pose estimation apparatus determines a straight line that passes a reference keypoint of the object in an arbitrary 3D pixel of the target object. The object pose estimation apparatus may acquire N straight lines that pass the reference keypoint based on the 3D keypoint offset image corresponding to all N pixels of a pixel region of the corresponding target object. The object pose estimation apparatus may determine 3D coordinates of the reference keypoint of the target object through a voting method. In an example, the object pose estimation apparatus may acquire 3D coordinates of M keypoints on the target object, may estimate M correspondence points on a 3D model of the object by least squares, and may acquire a 6D pose of the object by acquiring 3D rotation and 3D transformation between 3D points of two groups.

Referring to FIG. 3, the object pose estimation apparatus may acquire a confidence determination result of the depth image by extracting the image feature based on the color image and the depth image and by determining the confidence of the depth image based on the image feature. When the depth image is reliable, the object pose estimation apparatus fuses the image feature and the point cloud feature extracted based on the depth image, and acquires a 3D keypoint based on a fused feature.

When a plurality of target objects is present, the object pose estimation apparatus fuses a point cloud feature and an image feature corresponding to each target object and acquires a 3D keypoint based on a fused feature.

In detail, the object pose estimation apparatus acquires a fusion feature by fusing the image feature and the point cloud feature.

In an example, a process of estimating a pose of an object based on a fusion image is as follows. The object pose estimation apparatus estimates a 3D keypoint offset image based on a fusion feature of a target object using a tool of drawing a 3D image, such as an MPL tool, and estimates an object pose based on the 3D keypoint offset image.

An operation of estimating the pose of the object based on the 2D keypoint provided in operation 130 of FIG. 1 may be performed as follows.

In an example, the image feature based on the color image and the depth image may be extracted. The pose of the object may be estimated based on the image feature.

The corresponding method refers to a method of estimating the pose of the object based on the color image when the depth image is unreliable. The object pose estimation apparatus acquires contour data of an object in the depth image based on the depth image and estimates the pose of the object based on the contour data of the object in the depth image and the color image. Since an object pose estimation criterion does not include depth data of the object, object pose estimation based on the image feature is also referred to as 2D keypoint-based object pose estimation.

In an example, the object pose estimation based on the image feature may be performed through the object pose estimation apparatus estimates a 2D keypoint offset image of a corresponding target object based on an image feature of the target object using a CNN and estimates the pose of the object based on the 2D keypoint offset image.

The object pose estimation apparatus acquires a region image feature by optionally performing segmentation processing on the target object based on the image feature and acquires an instance segmentation image feature based on the region image feature. The object pose estimation apparatus estimates a 2D keypoint offset image by using the instance segmentation image feature as an input of the CNN and estimates the pose of the object based on the 2D keypoint offset image.

Here, two channels of each pixel in the 2D keypoint offset image represent a deviation vector from 2D coordinates of an object point corresponding to a corresponding pixel to 2D coordinates of a reference point of a target object.

In detail, estimating the pose of the object based on the 2D keypoint offset image may be performed through the following method. The object pose estimation apparatus determines a straight line that passes a reference point in an arbitrary pixel of the target object. The object pose estimation apparatus may acquire N straight lines that pass the reference point based on the 2D keypoint offset image corresponding to all N pixels of a pixel region of the corresponding target object. In an example, the object pose estimation apparatus may acquire 2D coordinates of the preset reference point of the target object through a voting method. In this manner, the object pose estimation apparatus may acquire 2D coordinates of M reference points preset on the target object and may acquire a 6D pose of the object by calculating 3D rotation and 3D shift between a camera coordinate system and an object coordinate system according to a Perspective-n-Point (PnP) algorithm using correspondence points of M keypoints on a 3D model.

Figure 5:
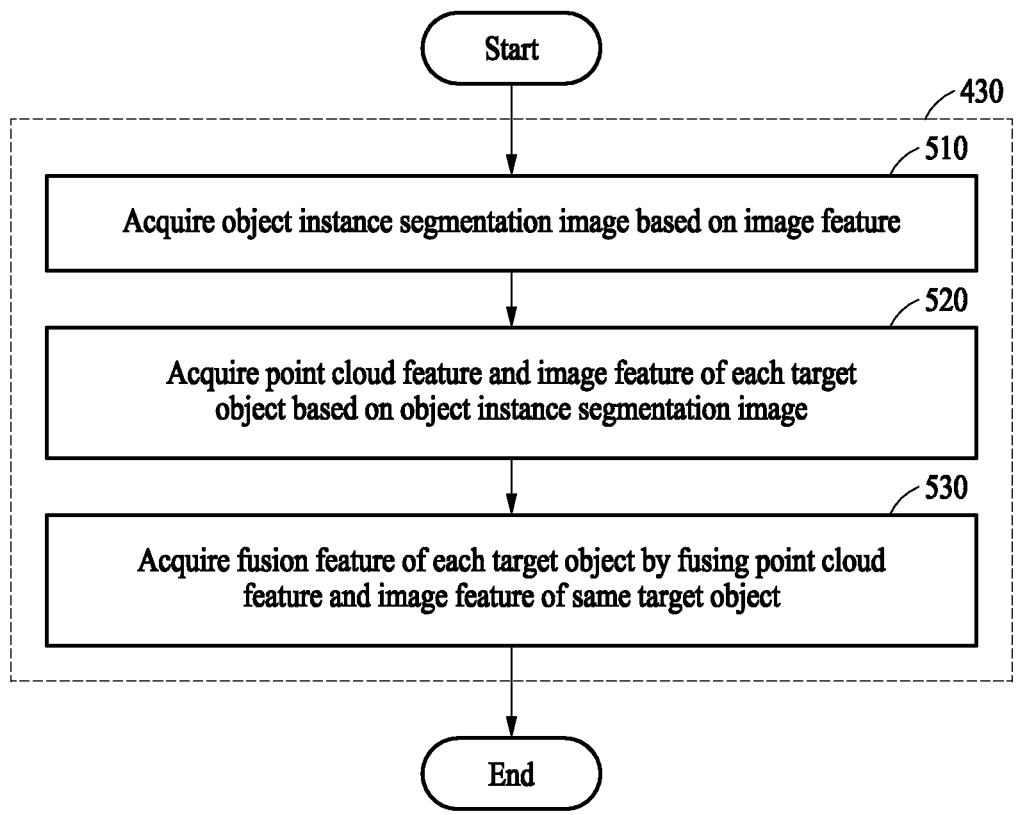
FIG. 5 illustrates an example of a process of acquiring a fused feature by fusing an image feature and a point cloud feature.

An operation of acquiring the fusion feature by fusing the image feature and the point cloud feature provided in operation 430 of FIG. 4 may be implemented through the following method of FIG. 5.

FIG. 5 illustrates an example of a process of acquiring a fused feature by fusing an image feature and a point cloud feature. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the object pose estimation apparatus acquires an object instance segmentation image based on an image feature.

In operation 520, the object pose estimation apparatus acquires a point cloud feature and an image feature of each target object based on the object instance segmentation image.

In operation 530, the object pose estimation apparatus acquires a fusion feature of each target object by fusing the point cloud feature and the image feature of the same target object.

Referring to FIG. 3, the object pose estimation apparatus acquires a region image feature by performing segmentation processing based on the image feature and acquires the object instance segmentation image by performing object instance segmentation based on the region image feature. The object pose estimation apparatus acquires an instance segmentation image feature, i.e., the image feature of the target object based on the region image feature and the object instance segmentation image. The object pose estimation apparatus acquires an instance segmentation geometric feature, that is, the point cloud feature of the target object based on the instance segmentation image and the point cloud feature. The object pose estimation apparatus acquires a fusion feature of each target object by fusing the point cloud feature and the image feature corresponding to the same target object.

The example of FIG. 3 provides another method of acquiring a fusion feature of a target object. The corresponding method may apply to a case in which at least one target object is present in a color image. Compared to a method of extracting features from a color image and a depth image and fusing the features, the corresponding method may subdivide the point cloud feature and the image feature of each target object through processing such as segmentation processing and instance segmentation and may acquire a further accurate fusion feature through two times of feature extraction.

The object pose estimation apparatus estimates the pose of the object based on the fusion feature, which includes the following operations. The object pose estimation apparatus estimates a pose of each target object based on a fusion feature of each target object.

Here, the object pose estimation apparatus estimates a pose of a corresponding target object based on the fusion feature of each target object. Here, the following operation is performed for each target object.

The object pose estimation apparatus estimates a 3D keypoint offset image based on the fusion feature of the target object, estimates a pose of the corresponding target object based on the 3D keypoint offset image, and sequentially acquires a pose of each target object.

When a plurality of target objects is present, the object pose estimation apparatus, the object pose estimation apparatus acquires an accurate fusion feature of each target object by performing segmentation processing and instance segmentation for each target object and estimates a pose of each target object based on the fusion feature. A method of estimating the pose of each target object based on the fusion feature is more effective in acquiring accurate poses of all target objects included in the color image.

When a plurality of target objects is present in an image, an example of estimating a pose based on an object relationship between the target objects is provided herein.

The object pose estimation apparatus acquires a first appearance feature of each target object and a geometric relationship feature between the respective target objects based on the color image and the depth image.

The object pose estimation apparatus acquires a second appearance characteristic of a corresponding target object based on a first appearance feature of the corresponding target object, a first appearance feature of another target object aside from the corresponding target object, and a geometric relationship feature between the corresponding target object and the other target object aside from the corresponding target object, with respect to each target object.

Figure 6:
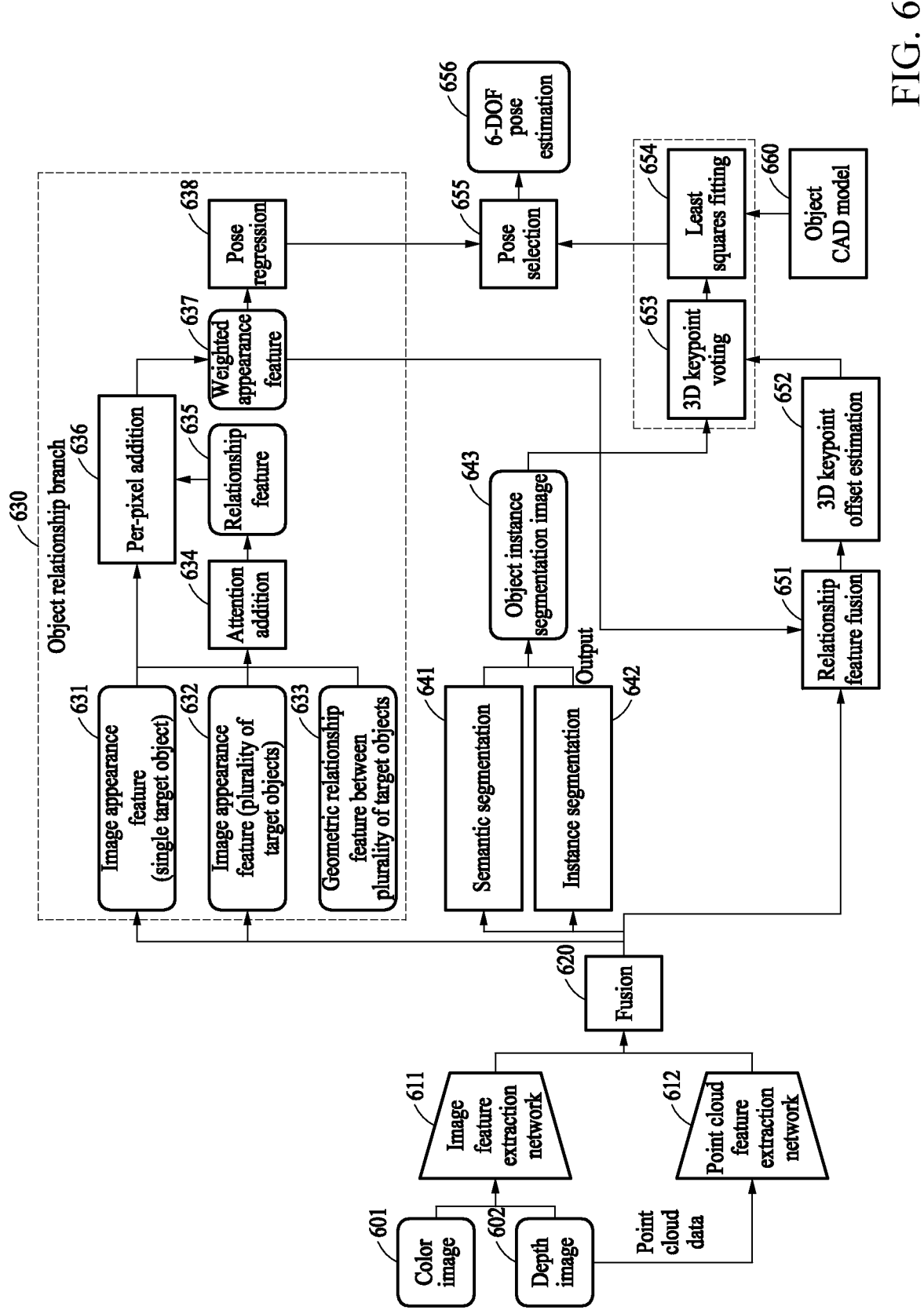
FIG. 6 illustrates an example of a process of estimating a pose of an object based on a one time of feature extraction and using a second appearance feature of a target object.

Referring to FIG. 6, the object pose estimation apparatus may perform feature extraction and fusion based on a color image and a depth image and may acquire a first appearance feature of each target object and a geometric relationship feature between the respective target objects based on a fusion feature. Further description related to each operation of FIG. 6 is made below. Here, the object pose estimation apparatus acquires an object instance segmentation image based on the fusion feature and acquires the geometric relationship feature between the respective target objects based on the object instance segmentation image.

In an example, a method of acquiring the first appearance feature of each target object based on the fusion feature may be implemented through the following method. In an example, the object pose estimation apparatus predicts coordinates of a central point of a target object including each pixel in input data and an appearance feature of the corresponding target object through a voting method, based on the fusion feature, acquires a plurality of target objects and a pixel of each target object through a clustering method for the predicted coordinates of the central point, and acquires the first appearance feature of each target object by fusing pixel features belonging to each corresponding target object, with respect to each target object.

Figure 7:
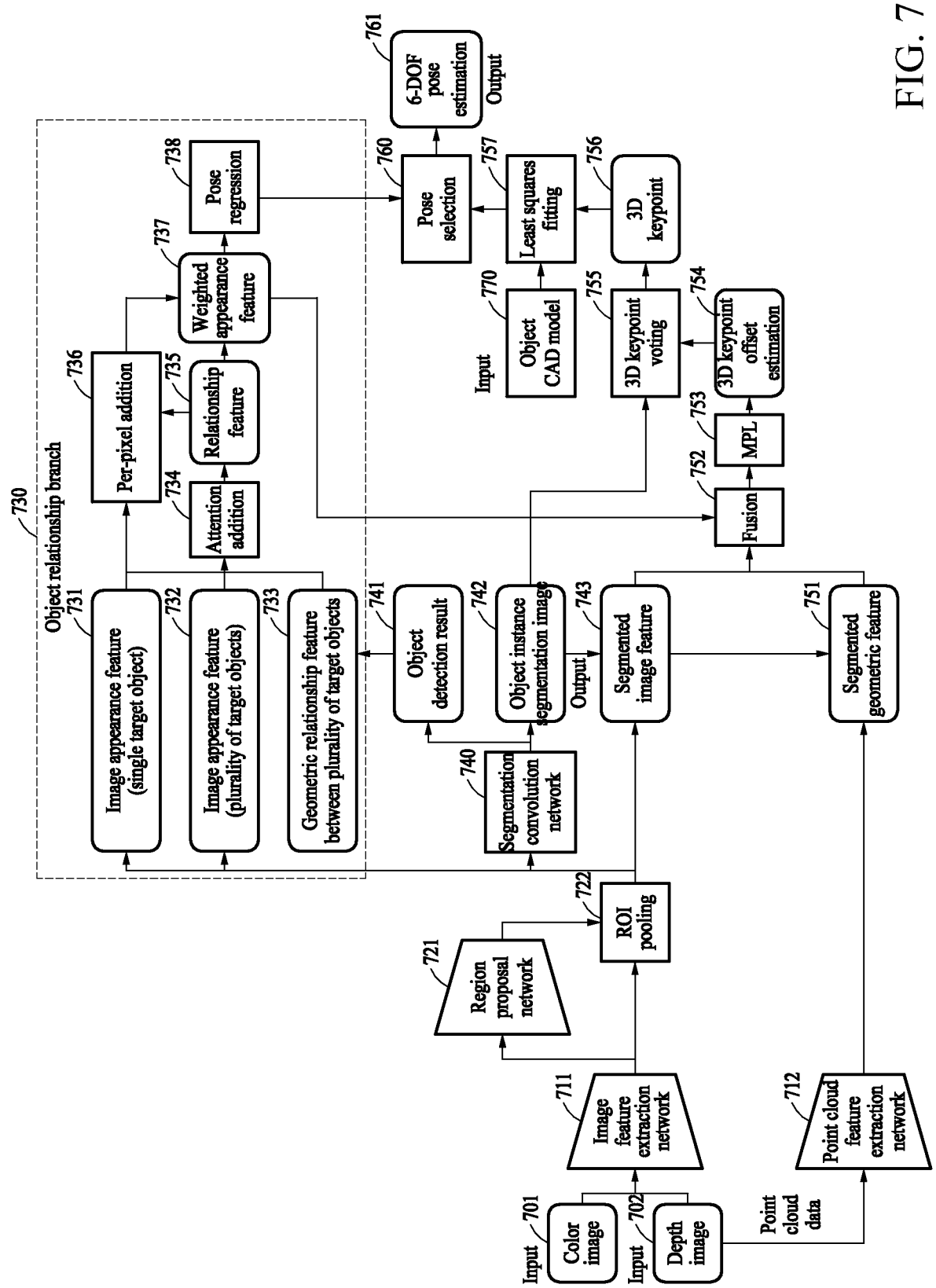
FIG. 7 illustrates an example of a process of estimating a pose of an object based on two times of feature extraction and using a second appearance feature of a target object.

Referring to FIG. 7, the object pose estimation apparatus may extract an image feature based on a color image and a depth image, may acquire a region image feature through segmentation processing based on the image feature, and may acquire a first appearance feature of each target object and a geometric relationship feature between the respective target objects based on the region image feature. Further description related to each operation of FIG. 7 is made below. Here, the object pose estimation apparatus detects an object based on the region image feature and acquires the geometric relationship feature between the respective target objects based on an object detection result.

The object pose estimation apparatus determines a second appearance feature of a corresponding target object based on a first appearance feature of the corresponding target object, a first appearance feature of another target object aside from the corresponding target object, and a geometric relationship feature between the corresponding target object and the other target object aside from the corresponding target object, with respect to each target object, and estimates a pose of an object based on the corresponding second appearance feature.

In another example, the object pose estimation apparatus may estimate the pose of the object based on the fusion feature through the following method. The object pose estimation apparatus estimates a pose of each target object based on the fusion feature and the second appearance feature of each target object.

Referring to FIG. 6, the object pose estimation apparatus estimates a 2D keypoint offset image and a 3D keypoint offset image by fusing a relationship feature according to a second appearance feature of a corresponding target object and a fusion feature of the target object. When the depth image is unreliable, the object pose estimation apparatus estimates a pose of an object based on the 2D keypoint offset image. When the depth image is reliable, the object pose estimation apparatus estimates the pose of the object based on the 3D keypoint offset image.

In an example, the pose of the object may be estimated based on the fusion feature. Referring to FIG. 7, the object pose estimation apparatus acquires a region image feature by performing segmentation processing based on the image feature, acquires an object instance segmentation image by performing object instance segmentation based on the region image feature, acquires a segmented image feature based on the region image feature and the object instance segmentation image, fuses features based on the segmented image feature, a segmented point cloud feature, and a second appearance feature of the target object, estimates a 3D keypoint offset image based on the fusion feature, and estimates the pose of the object based on the estimated 3D keypoint offset image.

A method of estimating a pose of an object based on the image feature estimates a pose of each target object based on the image feature and a second appearance feature of each target object.

In an example, the object pose estimation apparatus extracts an image feature based on the color image and the depth image, acquires a region image feature based on the image feature, acquires a segmented image feature based on the region image feature, estimates a 2D keypoint offset image based on an image feature of a corresponding target object and a corresponding second appearance feature, and estimates a pose of the target object based on the estimated 2D keypoint offset image.

In an example, the estimation of a pose of the object is based on a relationship feature of a target object, extracting and fusing geometric relationship information between a plurality of objects, determining a second appearance feature of a corresponding target object by adding a first appearance feature of a different target object, and improving accuracy and robustness in the object pose estimation, even in method in a situation in which an object occlusion, field cutting, and a small object are present.

In an example provided herein, acquiring a first appearance feature of each target object and a geometric relationship feature between the respective target objects based on the color image and the depth image may be performed through one of a first or a second method.

The first method includes extracting an image feature based on a color image or based on the color image and a depth image. Extracting point cloud data based on the depth image. Acquiring a fusion feature by fusing the image feature and the point cloud feature. Acquiring a first appearance feature of each target object and an object instance segmentation image based on the fusion feature, and acquiring a geometric relationship feature between the respective target objects based on the object instance segmentation image.

In the first method, the object pose estimation apparatus determines an appearance feature of each target object and the object instance segmentation image based on the fusion feature and acquires the geometric relationship feature between the respective target objects based on the object instance segmentation image. The method 1 may determine the appearance feature of each target object and the geometric relationship feature between the respective target objects based on a one time of feature extraction and may quickly verify the appearance feature of the target object and the geometric relationship feature between the respective target objects.

The second method includes extracting an image feature based on a color image and a depth image. Acquiring a region image feature corresponding to an image region of each target object based on the image feature. Acquiring a first appearance feature of each target object and a corresponding object detection result based on the region image feature corresponding to the region image of each target object. Acquiring a geometric relationship feature between the respective target objects based on the object detection result of each target object.

The second method is based on two times of feature extraction including extraction of the image feature and extraction of the region image feature. Through this, the object pose estimation apparatus acquires the first appearance feature of each target object and the geometric relationship feature between the respective target objects. Two times of feature extraction may improve accuracy of the first appearance feature and the geometric relationship feature between the respective target objects.

Meanwhile, the color image and the depth image may be acquired based on a single frame color depth image of a video. When a video frame corresponding to the color image and the depth image is an initial frame of the video, confidence of the depth image may be determined based on the color image and the depth image.

The color image and the depth image are extracted from a video frame that includes color information and depth information. When the video frame corresponding to the color image and the depth image is the initial frame of the video, that is, when there is no reference information about a pose of a previous video frame of the video frame, the object pose estimation apparatus determines confidence of the depth image based on the color image and the depth image. The confidence of the depth image may be determined according to one of the aforementioned examples.

Figure 8:
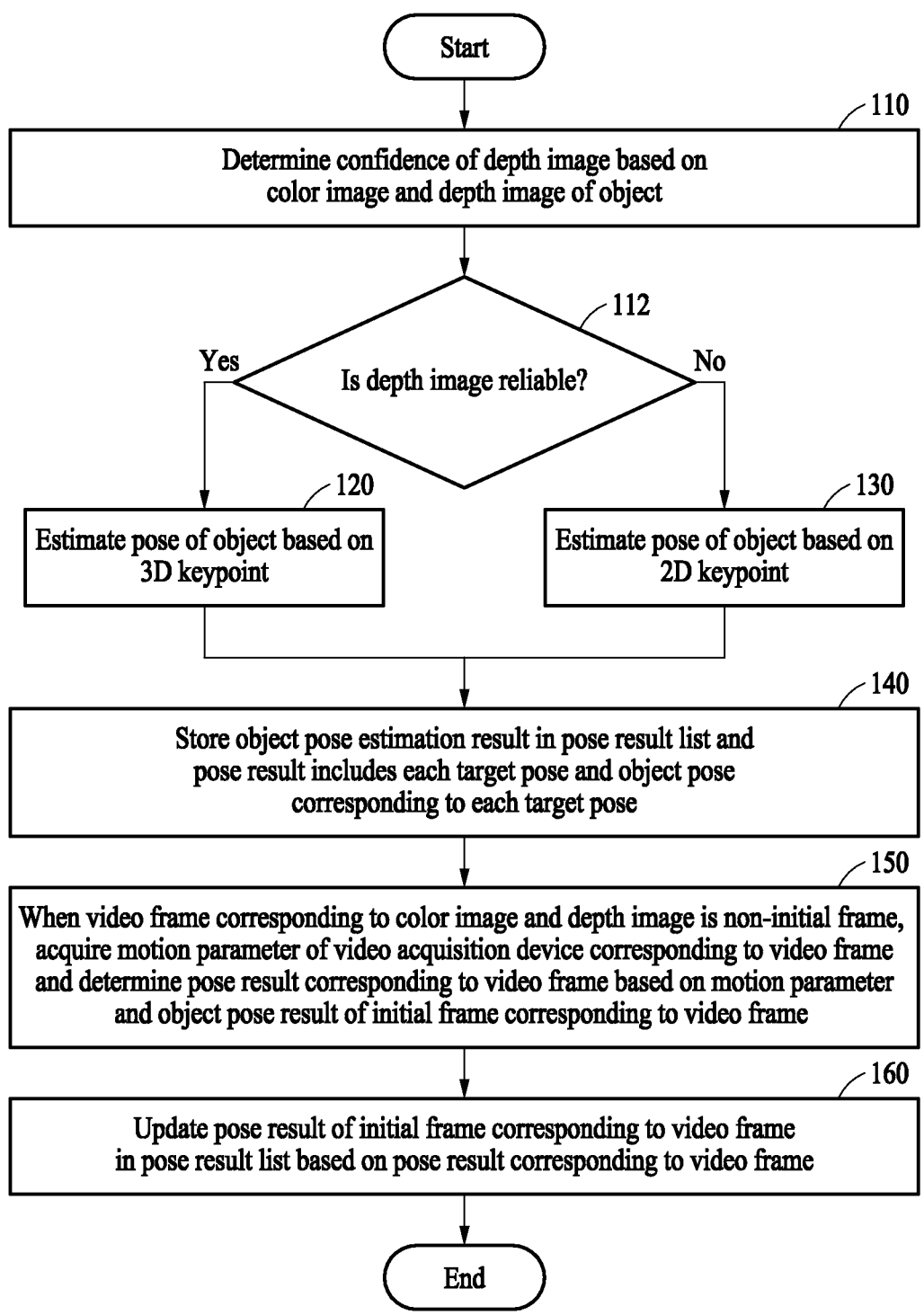
FIG. 8 illustrates another example of a process of estimating a pose of an object

FIG. 8 illustrates another example of a process of estimating a pose of an object. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

The process of FIG. 8 further includes the following operations after acquiring an object pose estimation result in operations 120 and 130 of FIG. 1.

In operation 140, the object pose estimation apparatus stores the object pose estimation result in a pose result list. Here, the pose result includes each target object and an object pose corresponding to each target object. To perform a subsequent pose estimation based on the acquired object pose, in an example, the acquired pose estimation result is stored in the preconfigured pose result list. That is, the object pose of the pose result list is used as a reference to simplify a subsequent object pose acquisition, to improve real-time performance of acquiring the object pose, and to decrease a data throughput.

Based thereon, when the video frame corresponding to the color image and the depth image is a non-initial frame, the object pose estimation apparatus acquires a motion parameter of a video acquisition device corresponding to the video frame and determines a pose result corresponding to the video frame based on the motion parameter and an object pose result of an initial frame corresponding to the video frame in operation 150.

In operation 160, the object pose estimation apparatus updates the pose result of the initial frame corresponding to the video frame in the pose result list, based on the pose result corresponding to the video frame.

A single video may include a plurality of video frame sequences. Here, each video frame sequence includes only a single initial frame, and a remaining video frame is a non-initial frame. When the video frame corresponding to the color image and the depth image is a non-initial frame, i.e., when an object pose corresponding to at least one target object is stored in the pose result list, for example, when a pose result list corresponding to at least the initial frame is stored in the pose result list, a motion parameter of the video acquisition device about a non-initial frame corresponding to the color image and the depth image is acquired. The corresponding motion parameter of the video acquisition device may be a single relative motion parameter. The relative motion parameter refers to a motion parameter of a device for acquiring a video frame of a non-initial frame against the initial frame and the object pose result of the corresponding video frame is determined based on the relative motion parameter and the object pose result of the initial frame of the corresponding video frame sequence.

The object pose estimation apparatus acquires a pose result corresponding to all of target objects in the corresponding video frame, stores a target object of the video frame and a pose result constituting an object pose corresponding thereto in the pose result list, regards the pose result corresponding to the video frame as a pose result of an initial frame corresponding to the video frame, and updates the pose result list.

In an example, the object pose estimation apparatus determines an object pose estimation of a non-initial frame in a video frame sequence that includes the initial frame based on the pose result corresponding to the initial frame and the motion parameter of the video acquisition device, and estimates an object pose using a difference between front and rear video frames, that is, adjacent video frames. A method of estimating a pose of a non-initial frame using an estimated pose of an initial frame may improve efficiency of object pose acquisition and real-time performance of acquiring the object pose. Also, since a difference in data between adjacent video frames is small, the above method updates the pose result list based on the pose result corresponding to the video frame of the non-initial frame, which leads to decreasing a data throughput of a subsequent video frame.

Hereinafter, some methods of determining whether a video frame is an initial frame in a video are further provided.

In the case of a single video frame, when the corresponding video frame is a first frame of the video, the video frame may be regarded as the initial frame of the video.

In the case of a single video frame, a target object and a target pose in the corresponding video frame may be determined by performing an object detection on the video frame, and whether the video frame is an initial frame may be determined by detecting whether the target object or the target pose first appears in the video frame. When the target object or the object pose first appears in the video frame, the video frame is the initial frame of the video.

Figure 9:
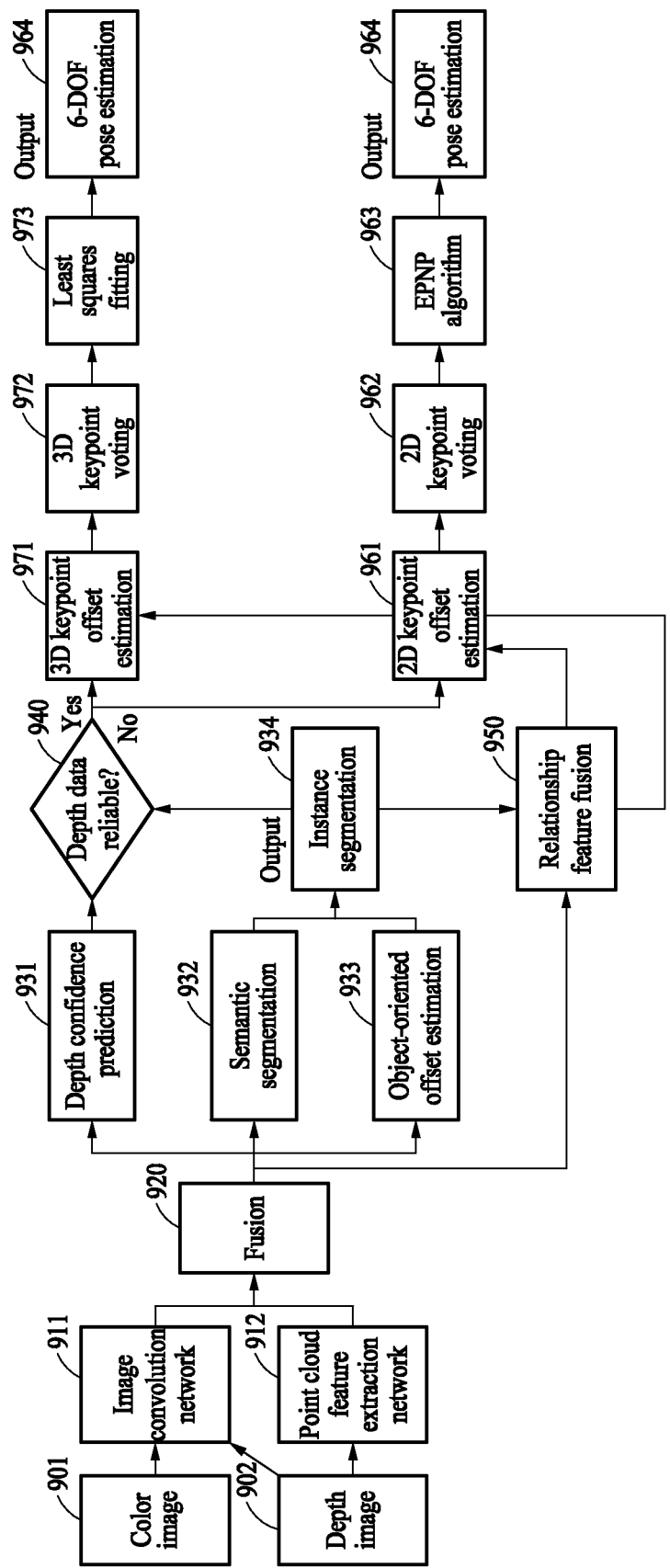
FIG. 9 illustrates an example of a process of estimating a pose of an object based on a color image and a depth image.
Figure 10:
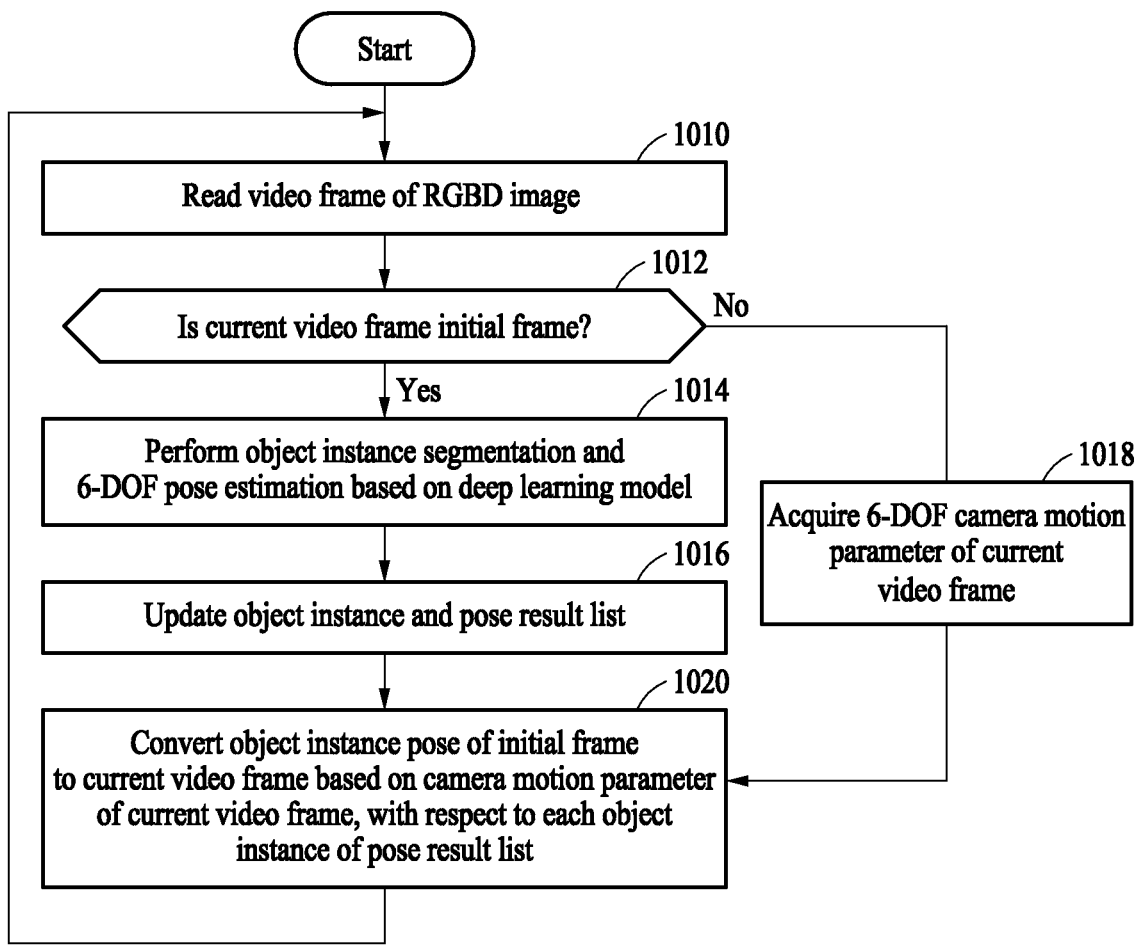
FIG. 10 illustrates an example of a process of estimating a pose of an object based on an initial frame of a video.

FIG. 10 illustrates an example of a process of estimating a pose of an object based on an initial frame of a video. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, in operation 1010, the object pose estimation apparatus reads a video frame of an RGBD image.

In operation 1012, the object pose estimation apparatus acquires a color image and a depth image of an object based on the RGBD image and determines whether a current video frame is an initial frame.

When the video frame is determined as the initial frame in operation 1012, in operation 1014, the object pose estimation apparatus performs object instance segmentation based on a CNN and estimates a 6-DOF pose of the object based on an object instance segmentation image.

In operation 1016, the object pose estimation apparatus acquires an object pose corresponding to a target object and updates a pose result list based on the target object and the object pose corresponding thereto.

When the video frame is determined as a non-initial frame in operation 1012, the object pose estimation apparatus acquires a 6-DOF camera motion parameter of the current video frame in operation 1018 and converts a pose of an object instance of the initial frame to the current video frame using on a camera motion parameter in the current video frame based on the acquired 6-DOF camera motion parameter of the current video frame, with respect to each object instance of the pose result list, and acquires an object pose of the corresponding non-initial frame in operation 1020.

Figure 11:
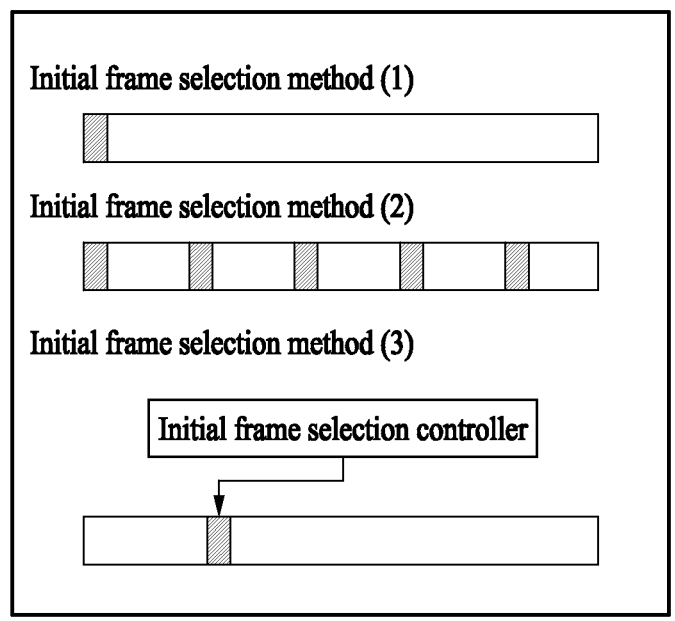
FIG. 11 illustrates an example of a method of selecting three initial frames.

FIG. 11 illustrates an example of a method of selecting three initial frames.

In the case of an arbitrary video frame, when the corresponding video frame is a first frame of a video, the video frame may be an initial frame of the video. When a single video includes only a single initial frame, the initial frame is a first frame of the video, which corresponds to an initial frame selection method (1) of FIG. 11.

A video may be divided into a plurality of video frame sequences based on a preset period. A first frame of each video frame sequence is an initial frame of a corresponding video frame sequence, which corresponds to an initial frame selection method (2).

An initial frame selection method (3) is provided herein. The initial frame selection method (3) may divide a video into at least one video frame sequence. For example, an initial frame selection controller disclosed in the initial frame selection method (3) of FIG. 11 determines that a video frame corresponding to a new object and a new pose is an initial frame of a corresponding video frame sequence through monitoring of the new object and the new pose.

In an example, the object pose estimation apparatus performs an object detection on each video frame of a video, determines a target object and a pose in a corresponding video frame based on a detection result, and determines whether the target object or the object pose first appears in the corresponding video frame through detection. For example, the object pose estimation apparatus may compare a target object and an object pose corresponding to a current video frame to a target object and an object pose in a pose result list and may determine whether the target object and the object pose corresponding to the current video frame first appear, and may determine the corresponding video frame as an initial frame of a corresponding video or video clip when at least one new target object or new object pose appears in the video frame.

In an example, whether a video frame is an initial frame may be determined and target processing may be performed based on a determination result through the aforementioned method. When the video frame is a non-initial frame, the object pose estimation apparatus may estimate a pose of an object based on a motion parameter corresponding to the video and an object pose of the initial frame and may improve real-time performance of object pose estimation.

The aforementioned method of determining whether the video frame is the initial frame depending on whether a new object or a new pose appears in the video frame may be used for the object pose estimation method.

Compared to a method of setting only a first frame as an initial frame in a single video, the method of determining the initial frame depending on whether the new object or the new pose appears may decrease a data throughput for object pose estimation of a non-initial video frame based on the initial frame.

Figure 12:
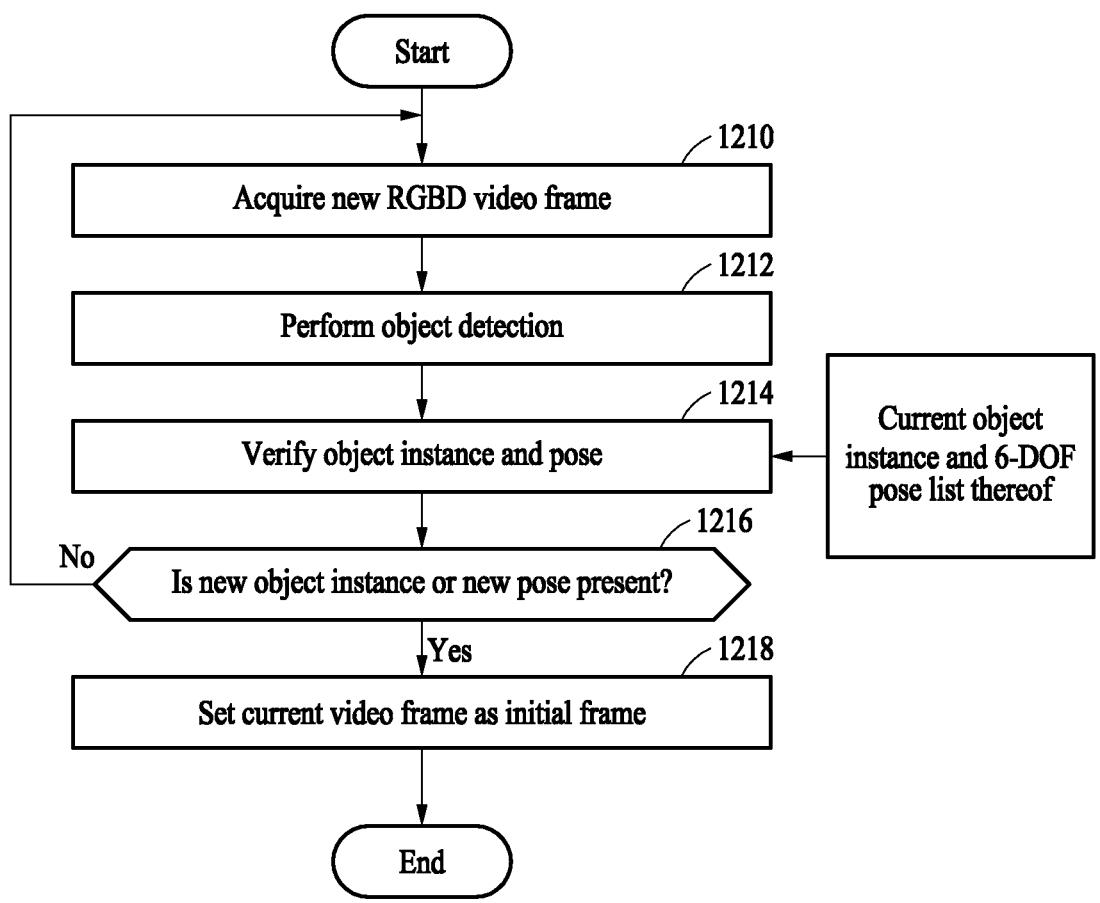
FIG. 12 illustrates an example of a process of determining whether a video frame is an initial frame based on an object detection.

FIG. 12 illustrates an example of a process of determining whether a video frame is an initial frame based on an object detection. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

Referring to FIG. 12, in operation 1210, the object pose estimation apparatus acquires a new RGBD video frame.

The object pose estimation apparatus acquires a target object and an object pose in a video frame through an objection detection in operation 1212 and compares the acquired target object and object pose to a pose result list, that is, a current object instance and a 6-DOF pose list thereof in operation 1214.

In operation 1216, the object pose estimation apparatus determines whether a new object instance or a new pose is present based on a comparison result.

When the new object instance or the new instance is absent in operation 1216, the object pose estimation apparatus acquires a new frame by returning to operation 1210.

When the new object instance or the new instance is present in operation 1216, the object pose estimation apparatus sets the current video frame as the initial frame in operation 1218.

Whether a corresponding video frame is an initial frame is determined through one of the aforementioned methods. When the video frame is the initial frame, the object pose estimation apparatus estimates a pose of an object using a method of determining depth data confidence of a depth image and estimating the pose of the object based on a determination result. When the video frame is a non-initial frame, the object pose estimation apparatus estimates the pose of the object pose using the method provided in operations 150 and 160 of FIG. 8.

Detecting whether the target object or the object pose first appears in the video frame may be implemented through the following method. The method may include the following operations.

An image bounding box of each target object may be acquired in a corresponding video frame.

The image bounding box of each target object and an image bounding box corresponding to each target object of a pose result list may be matched.

When a matching target object is present in the pose result list, compare first point cloud data of the image bounding box corresponding to each target object in a corresponding video frame to a second point cloud data frame corresponding to each target object in a previous video frame of the corresponding video frame and determine whether a difference is present between the first point cloud data and second point cloud data, and when the difference is present, determine that a pose of an object corresponding to the target object first appears.

When the matching target object is absent in the object pose result list, determine that the target object first appears.

The detection method compares an image bounding box of a target object in a video frame and an image bounding box of the target object of the pose result list and determines that the target object of the video frame first appears when an image bounding box matching the image bounding box of the target object of the video frame is absent in the pose result list and determines that the target object of the video frame does not first appear when the image bounding box matching the image bounding box of the target object of the video frame is present in the pose result list.

In the case of the video frame in which the target object does not first appear, the object pose estimation apparatus further determines an object pose of the target object and compares first point cloud data of an image bounding box corresponding to the target object in the video frame to second point cloud data corresponding to the target object in the previous video frame of the video frame. When the first point cloud data is identical to the second point cloud data, the object pose estimation apparatus determines that a pose of the target object in the corresponding video frame does not first appear. When the first point cloud data differs from the second point cloud data, that is, when a data difference is present, the object pose estimation apparatus determines that the object pose of the target object first appears.

Figure 13:
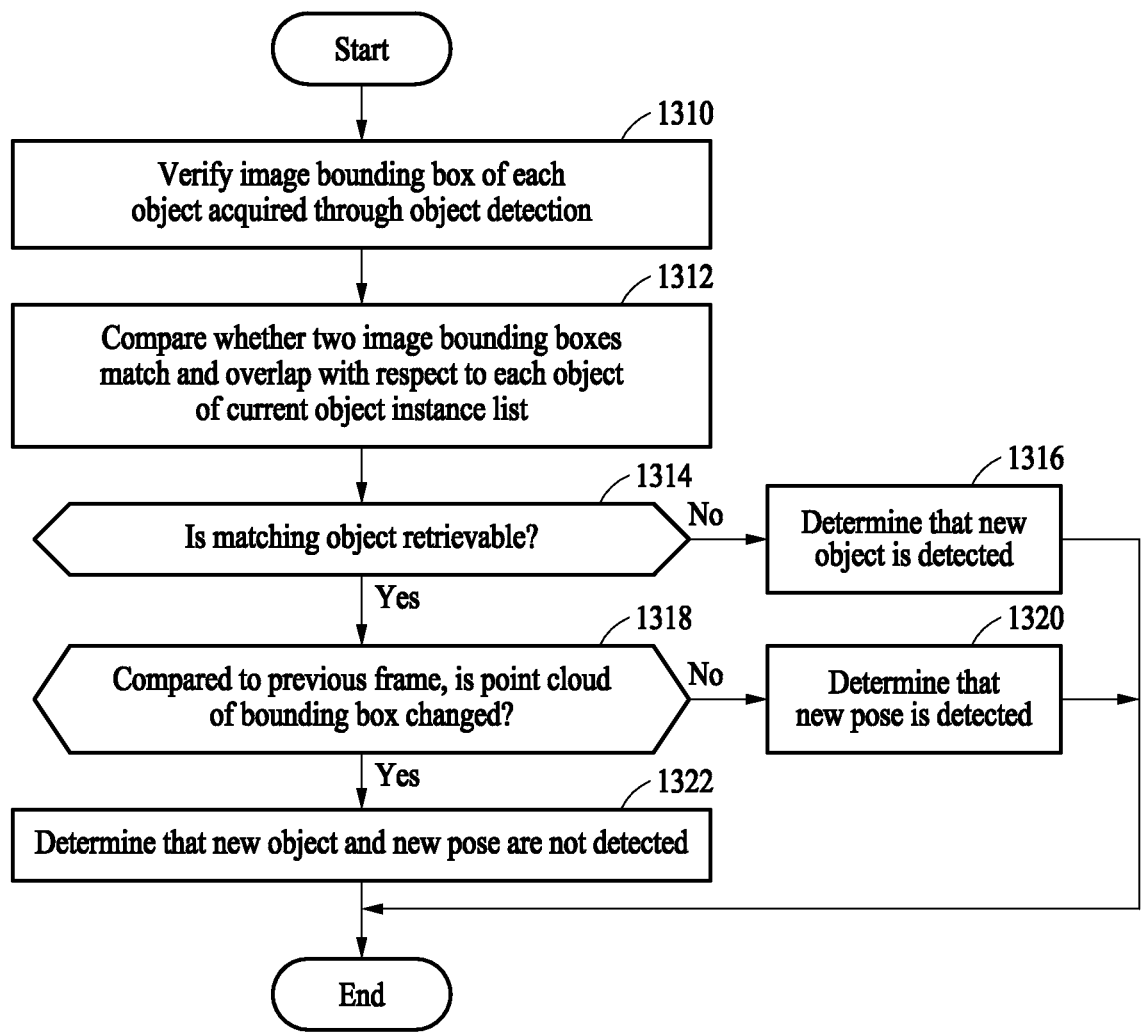
FIG. 13 illustrates an example of a process of verifying whether a new object or a new pose is present.

FIG. 13 illustrates an example of a process of verifying whether a new object or a new pose is present. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer, such as a processor, that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

In operation 1310, the object pose estimation apparatus verifies an image bounding box of each object acquired through object detection.

In operation 1312, the object pose estimation apparatus compares whether two image bounding boxes match and overlap with respect to each object of a current object instance list.

In operation 1314, the object pose estimation apparatus verifies whether an object of which two image bounding boxes match is retrievable.

When the object of which two image bounding boxes mismatch is absent in operation 1314, the object pose estimation apparatus determines that a new object is detected in operation 1316.

When the object of which two image bounding boxes match is present in operation 1314, the object pose estimation apparatus compares the current video frame to a previous frame of the current video frame and verifies whether a point cloud of a bounding box is changed in operation 1318.

When it is determined that the point cloud of the bounding box is changed in operation 1318, the object pose estimation apparatus determines that a new pose is detected in operation 1320.

When it is determined that the point cloud of the bounding box is not changed in operation 1318, the object pose estimation apparatus determines that the new object and the new pose are not detected in operation 1322.

Herein, a method of determining whether a target object or an object pose first appears in a video frame is provided. When it is determined that one of the target object and the object pose first appears, the object pose estimation apparatus determines the corresponding video frame as an initial frame and estimates a pose of an object according to the method provided in operations 110 to 140 of FIG. 8. Here, determination related to a target object based on an image bounding box may quickly and accurately determine whether the target object is a new object without further detailed data. When the object pose first appears may be accurately determined by comparing point cloud data between image bounding boxes.

To further easily understand and explain the methods provided herein, some examples are described through combination hereinafter. In FIGS. 2, 3, 6, and 7, a sharp rectangle represents a task operation and a round rectangle represents a processing result.

EXAMPLE 1

FIG. 9 illustrates an example of a process of estimating a pose of an object based on a color image and a depth image.

Referring to FIG. 9, the object pose estimation apparatus acquires a color image 901 and a depth image 902 of the same object, acquires an image feature by performing an image feature extraction on the color image 901 and the depth image 902 using an image convolution network 911, acquires a point cloud feature by performing a point cloud feature extraction on point cloud data of the depth image 902 using a point cloud feature extraction network 912, and acquires a fusion feature by performing a fusion 920 on the image feature and the point cloud feature.

The object pose estimation apparatus performs operations of the following two branches based on the fusion feature.

In a first branch, the object pose estimation apparatus acquires a depth confidence image by performing a depth confidence prediction 931 based on the fusion feature, acquires an object semantic segmentation image by performing a semantic segmentation 932 on an object based on the fusion feature, acquires an object-oriented image by performing an object-oriented offset estimation 933, and acquires an object instance segmentation image by performing an instance segmentation 934 on an image based on the object semantic segmentation image and the object-oriented image.

The object pose estimation apparatus performs a depth data confidence determination 940 based on the object instance segmentation image and the depth confidence image.

In a second branch, the object pose estimation apparatus acquires a fused feature by performing a fusion 950 on a relationship feature between the object instance segmentation image and the fusion feature.

The object pose estimation apparatus determines whether to use a 2D keypoint or whether to use a 3D keypoint for object pose estimation based on a result of determining the depth data confidence. In detail, when depth data is unreliable, the object pose estimation apparatus acquires a 2D keypoint offset image by performing a 2D keypoint offset estimation 961 based on the fused feature. The object pose estimation apparatus acquires 2D coordinates of a preset reference keypoint by performing a 2D keypoint voting 962 based on the 2D keypoint offset image and performs 6-DOF pose estimation 964 by presetting 3D coordinates of the reference keypoint based on an efficient PNP (EPnP) algorithm 963.

When the depth data is reliable, the object pose estimation apparatus performs a 3D keypoint offset estimation 971 based on the fused feature, performs a 3D keypoint voting 972 based on a 3D keypoint offset image, and performs a 6-DOF pose estimation 974 through least squares fitting 973.

EXAMPLE 2

FIG. 2 illustrates an example of a process of estimating a pose of an object based on a one time feature extraction.

Referring to FIG. 2, the object pose estimation apparatus acquires a color image 201 and a depth image 202 of the same object, acquires an image feature by performing an image feature extraction on the color image 201 and the depth image 202 using an image feature extraction network 211, and acquires a point cloud feature by performing a point cloud feature extraction on point cloud data of the depth image 202 using a point cloud feature extraction network 212.

The object pose estimation apparatus performs a fusion 220 on the acquired image feature and point cloud feature. Here, a fusion task may be a high-density fusion and the object pose estimation apparatus performs an operation of the following three branches based on the fusion feature.

First, the object pose estimation apparatus predicts a depth confidence of an image based on the fusion feature and acquires a depth confidence image 231.

Second, the object pose estimation apparatus acquires an object semantic segmentation image 232 by performing a semantic segmentation on the object based on the fusion feature, and acquires an object-oriented image 233 through an object-oriented offset estimation.

Third, the object pose estimation apparatus acquires a 2D keypoint offset image 234 and a 3D keypoint offset image 235.

The object pose estimation apparatus acquires an object instance segmentation image 241 by performing an object instance segmentation based on the object semantic segmentation image 232 and the object-oriented image 233, performs a depth data confidence determination 250 based on the object instance segmentation image 241 and the depth confidence image 231, and determines whether to perform an object pose estimation using a 2D keypoint or whether to perform the object pose estimation using a 3D keypoint based on a determination result.

In an example, when depth data is unreliable, the object pose estimation apparatus acquires 2D coordinates of a preset reference keypoint by performing a 2D keypoint voting 261 based on a 2D keypoint offset image and performs a 6-DOF pose estimation 263 by presetting 3D coordinates of the reference keypoint based on a PnP algorithm 262.

When the depth data is reliable, the object pose estimation apparatus acquires 3D coordinates of the reference keypoint by performing a 3D keypoint voting 271 based on a 3D keypoint offset image and performs a 6-DOF pose estimation 273 through least squares fitting 272.

The object pose estimation apparatus may use an object CAD model 280 to estimate a 6D pose. Here, the object CAD model 280 may be a simple geometric body, such as a plane, a cylinder, or any type of geometric structures, and may be a 3D model acquired through laser scanning or other methods.

EXAMPLE 3

FIG. 3 illustrates an example of a process of estimating a pose of an object based on two times of feature extraction.

Referring to FIG. 3, the object pose estimation apparatus acquires a color image 301 and a depth image 302 of the same object and acquires an image feature by performing an image feature extraction on the color image 301 and the depth image 302 using an image feature extraction network 311. The object pose estimation apparatus performs segmentation processing by inputting the image feature to a region proposal network 321 and acquires a region image feature through ROI pooling 322.

The object pose estimation apparatus acquires a depth confidence image 332 by performing feature processing of a fully connected layer 331 based on the region image feature and acquires an object instance segmentation image 342 by segmenting an object instance using a CNN segmentation network 341.

The object pose estimation apparatus acquires an instance segmentation image feature 343 based on the object instance segmentation image 342 and the region image feature.

The object pose estimation apparatus performs a depth data confidence determination 350 based on the instance segmentation image feature 343 and the depth confidence image 332.

When depth data is unreliable, the object pose estimation apparatus inputs an object pose estimation by using the instance segmentation image feature 343 as a 2D keypoint. In detail, the object pose estimation apparatus outputs a 2D keypoint offset image of the object by using the instance segmentation image feature 343 as an input of a CNN 361, acquires 2D coordinates of a preset reference keypoint by performing a 2D keypoint voting 362 based on the 2D keypoint offset image and performs a 6-DOF pose estimation 364 by presetting 3D coordinates of the preference keypoint based on an efficient PnP (EPnP) algorithm 363.

When depth data corresponding to the depth image 302 is reliable, the object pose estimation apparatus performs a fusion 372 on an acquired instance segmentation geometric feature 371 using the instance segmentation image feature 343 and a power feature extraction network, and estimates a pose of an object based on a 3D keypoint that is a fused feature.

In an example, the object pose estimation apparatus estimates a 3D keypoint offset image based on a fusion feature of a target object using a 3D drawing tool (MPL) 373, acquires 3D coordinates of the reference keypoint by performing a 3D keypoint voting 374 based on the 3D keypoint offset image, and performs a 6-DOF pose estimation 376 through least squares fitting 375.

The object pose estimation apparatus may use an object CAD model 380 to estimate a 6D pose. Here, the object CAD model 380 may be a simple geometric body, such as a plane, a cylinder, or any type of geometric structures, and may be a 3D model acquired through laser scanning or other methods.

Compared to the method of FIG. 2, the method of FIG. 3 employs a 2-stage feature extraction network for feature extraction and leads to acquiring an accurate object pose estimation result by further subdividing the extracted feature.

EXAMPLE 4

FIG. 6 illustrates an example of a process of estimating a pose of an object based on a one time of feature extraction and using a second appearance feature of a target object.

Referring to FIG. 6, the object pose estimation apparatus acquires an image feature by performing an image feature extraction on a color image 601 and a depth image 602 using an image feature extraction network 611, and acquires a point cloud feature by performing a point cloud feature extraction on converted point cloud data of the depth image 602 using a point cloud feature extraction network 612.

The object pose estimation apparatus acquires a fusion feature by performing a fusion 620 on the image feature and the point cloud feature and acquires an object instance segmentation image 643 by performing an object semantic segmentation 641 and an object instance segmentation 632 based on the fusion feature.

Compared to the method of FIG. 2, the method of FIG. 6 adds an object relationship branch 630. A weighted appearance feature 637 acquired from the object relationship branch 630 affects a 3D keypoint-based object pose estimation and does not affect a 2D keypoint-based object pose estimation. The 2D keypoint-based object pose estimation is identical to the method of FIG. 2. Therefore, the 3D keypoint-based object pose estimation is used as an example for the following description. In the object relationship branch 630, the object pose estimation apparatus determines an image appearance feature 631 of a single target object and image appearance features 632 of a plurality of target objects based on the fusion feature. In an example, the object pose estimation apparatus acquires a first appearance feature of each target object, acquires a geometric relationship feature 633 between the plurality of target objects based on the object instance segmentation image 643, and acquires a relationship feature 635 of a target object by performing an attention addition 634 on the first appearance feature of each target object and the geometric relationship feature 633 between the respective target objects.

The object pose estimation apparatus acquires the weighted appearance feature 637 of a corresponding target object, that is, a second appearance feature of the target object by performing a per-pixel addition 636 on the acquired relationship feature 635 of the target object and a first appearance feature corresponding thereto.

The object pose estimation apparatus performs a pose regression 638 based on the second appearance feature. For example, the object pose estimation apparatus acquires a predicted object pose in the object relationship branch 630 by processing the second appearance feature using a regression network.

The object pose estimation apparatus performs a 3D keypoint offset estimation 652 by performing a relationship feature fusion 651 based on the second appearance feature and the fusion feature and acquires a 3D keypoint offset image. When the depth image 602 is reliable, the object pose estimation apparatus acquires 3D coordinates of the reference keypoint by performing a 3D keypoint voting 653 based on the 3D keypoint offset image, estimates an object pose through least squares fitting 654, and acquires the object pose based on the 3D keypoint.

The object pose estimation apparatus acquires the object pose predicted in the object relationship branch 630 and the object pose based on the 3D keypoint and performs an object pose selection 655, implements a 6-DOF pose estimation 656 by adjusting a selection criterion based on an actual situation, and acquires a 6D pose of the object.

The object pose estimation apparatus may use an object CAD model 660 to estimate the 6D pose.

The corresponding method estimates an object pose by adding an object relationship analysis and by combining a relationship feature between different objects, which may lead to increasing accuracy of an image region corresponding to each target object. Also, an accurate image region segmentation may improve accuracy of object pose estimation.

EXAMPLE 5

FIG. 7 illustrates an example of a process of estimating a pose of an object based on two times of feature extraction and using a second appearance feature of a target object.

Referring to FIG. 7, the object pose estimation apparatus acquires an image feature by performing an image feature extraction on a color image 701 and a depth image 702 using an image feature extraction network 711. The object pose estimation apparatus performs segmentation processing by inputting the image feature to a region proposal network 721 and acquires a region image feature through ROI pooling 722.

Compared to the method of FIG. 3, the method of FIG. 7 adds an object relationship branch 730, that is, acquires a first appearance feature (731, 732) of each target object and a geometric relationship feature 733 between the respective target objects based on the region image feature. Here, the first appearance feature of each target object corresponds to an image appearance feature of a single target object 731 and image appearance features 732 of a plurality of target objects. In the object relationship branch 730, the geometric relationship feature 733 between the respective target objects is acquired based on an object detection result 741. The object detection result 741 is acquired by inputting the acquired region image feature to a segmentation convolution network 740.

The object pose estimation apparatus acquires a relationship feature 735 of a target object by performing an attention addition 734 on the image appearance feature 731 of the single target object, the image appearance features 732 of the plurality of target objects, and the geometric relationship feature 733 between the plurality of target objects. The object pose estimation apparatus acquires a weighted appearance feature 737, that is, a second appearance feature of the target object by performing a per-pixel addition 736 on the relationship feature 735 and the appearance feature of the target object. The object pose estimation apparatus performs a pose regression 738 based on the second appearance feature. For example, the object pose estimation apparatus acquires a predicted object pose in the object relationship branch 730 by processing the second appearance feature using a regression network.

Compared to the method of FIG. 3, the method of FIG. 7 adds the object relationship branch 730. The weighted appearance feature 737 acquired in the object relationship branch 730 affects a 3D keypoint-based object pose estimation and does not affect a 2D keypoint-based object pose estimation. The 2D keypoint-based object pose estimation is identical to the method of FIG. 3. Therefore, the 2D keypoint-based object pose estimation is used as an example for the following description.

The object pose estimation apparatus acquires the region image feature after ROI pooling 722, acquires an object instance segmentation image 742 by inputting the region image feature to the segmentation convolution network 740, and acquires a segmented image feature 743, that is, an instance segmentation image feature based on the region image feature and the object instance segmentation image 742.

The object pose estimation apparatus acquires a segmented geometric feature 751, that is, an instance segmentation geometric feature by performing a point cloud data conversion and a point cloud feature extraction on the depth image 702.

The object pose estimation apparatus performs a fusion 752 on the acquired segmented image feature 743, segmented geometric feature 751, and weighted appearance feature 737, performs a 3D keypoint offset estimation 754 based on the fusion feature using a 3D drawing tool (MPL) 753, acquires 3D coordinates of a reference keypoint by performing a 3D keypoint voting 755 based on a 3D keypoint offset image, estimates an object pose through least squares fitting 757, and acquires the object pose based on a 3D keypoint 756.

The object pose estimation apparatus performs a pose selection 760 based on the object pose predicted in the object relationship branch 730 and the object pose based on the 3D keypoint 756 and performs a 6-DOF pose estimation 761, that is, determines a 6D pose of an object based on a set selection criterion.

The corresponding method adds an object relationship analysis based on a 2-stage feature extraction. The method may improve accurate segmentation of each object region based on a more accurate feature, may estimate an object pose by combining relationship features between different objects, and accordingly, may improve accuracy of an image region corresponding to each target object and accuracy of object pose estimation.

Figure 14:
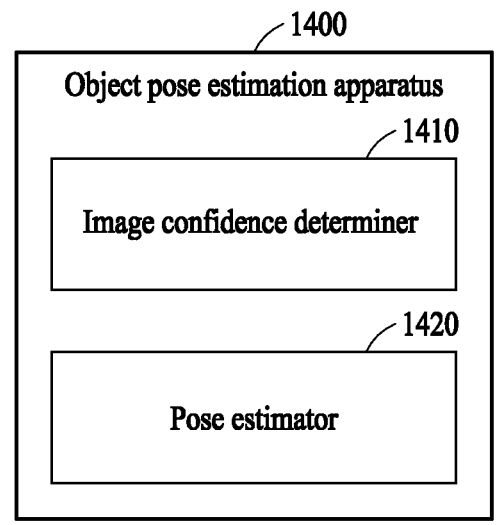
FIG. 14 illustrates an example of a configuration of an object pose estimation apparatus.

FIG. 14 illustrates an example of a configuration of an object pose estimation apparatus.

Referring to FIG. 14, an object pose estimation apparatus 1400 includes an image confidence determiner 1410 and a pose estimator 1420.

The image confidence determiner 1410 determines confidence of a depth image of an object based on a color image and the depth image of the object.

When the depth image is reliable, the pose estimator 1420 estimates a pose of the object based on a 3D keypoint.

When the depth image is unreliable, the pose estimator 1420 determines the pose of the object based on a 2D keypoint.

Although not illustrated, the image confidence determiner 1410 may include at least one of a fusion feature confidence determiner and an image feature confidence determiner.

The fusion feature confidence determiner extracts an image feature based on the color image or based on the color image and the depth image, extracts a point cloud feature based on the depth image, acquires a fusion feature by fusing the image feature and the point cloud feature, and determines confidence of the depth image based on the fusion feature.

The image feature confidence determiner extracts the image feature based on the color image and the depth image and determines the confidence of the depth image based on the image feature.

In an example, the fusion feature confidence determiner acquires an object instance segmentation image and a depth confidence image based on the fusion feature and determines the confidence of the depth image corresponding to each target object in the color image based on the object instance segmentation image and the depth confidence image.

The image feature confidence determiner acquires an object instance segmentation image and a depth confidence image based on the image feature and determines the confidence of the depth image corresponding to each target object in the color image based on the object instance segmentation image and the depth confidence image.

The image feature confidence determiner acquires a region image feature of the image region corresponding to each target object based on the image feature, determines a depth confidence image of a corresponding target object based on a region image feature corresponding to the corresponding target object for each target object, and acquires the object instance segmentation image based on the region image feature corresponding to each target object, with respect to each target object.

Although not illustrated, the object pose estimation apparatus 1400 may further includes a geometric relationship feature acquirer and a second appearance feature determiner.

The geometric relationship feature acquirer acquires a first appearance feature of each target object and a geometric relationship feature between the respective target objects based on the color image and the depth image.

The second appearance feature determiner determines a second appearance feature of a corresponding target object based on a first appearance feature of the corresponding target object, a first appearance feature of another target object aside from the corresponding target object, and a geometric relationship feature between the corresponding target object and the other target object aside from the corresponding target object, with respect to each target object.

The pose estimator 1420 may estimate a pose of each target object based on the fusion feature and the second appearance feature of each target object. In another example, the pose estimator 1420 may estimate a pose of each target object based on the image feature and the second appearance feature of each target object.

The geometric relationship feature acquirer may acquire the geometric relationship feature through at least one of the following two methods.

As a first method, the geometric relationship feature acquirer may extract an image feature based on the color image or based on the color image and the depth image, may extract a point cloud feature based on the depth image, may acquire a fusion feature by fusing the image feature and the point cloud feature, may acquire a first appearance feature of each target object and an object instance segmentation image based on the fusion feature, and may acquire a geometric relationship feature between the respective target objects based on the object instance segmentation image.

As a second method, the geometric relationship feature acquirer may extract an image feature based on the color image and the depth image, may acquire a region image feature corresponding to an image region of each target object based on the image feature, may acquire a first appearance feature of each target object and an object detection result corresponding thereto based on the region image feature corresponding to the image region of each target object, and may acquire a geometric relationship feature between the respective target objects based on the object detection result of each target result.

The object pose estimation apparatus 1400 may further include an initial frame section (not shown).

The initial frame section is used to detect whether a target object or a target pose first appears in a video frame and to determine whether the video frame is an initial frame.

The initial frame section may acquire an image bounding box of each target object in a corresponding video frame, may match the image bounding box of each target object and an image bounding box corresponding to each target object of a pose result list, and, when a matching target object is present in the pose result list, may compare first point cloud data of the image bounding box corresponding to each target object in the corresponding video frame and a second point cloud data frame corresponding to each target object in a previous video frame of the corresponding video frame and may determine whether a difference is present between the first point cloud data and second point cloud data, and may determine that the object pose corresponding to the target object first appears when the difference is present, and may determine that the target object first appears when the matching target object is absent.

Figure 15:
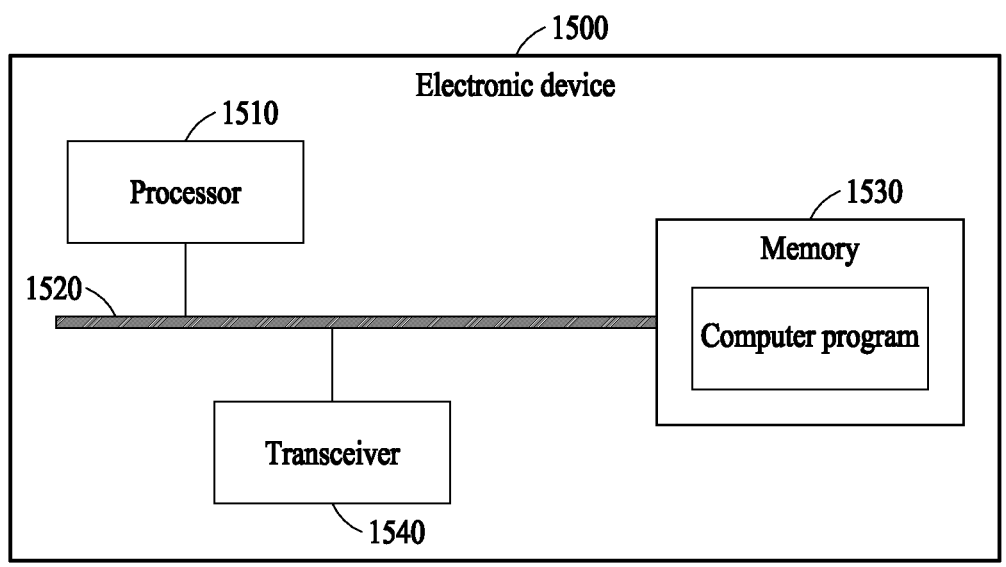
FIG. 15 illustrates an example of a configuration of an electronic device.

FIG. 15 illustrates an example of a configuration of an electronic device.

Referring to FIG. 15, an electronic device 1500 includes a processor 1510 and a memory 1530. The processor 1510 is connected to the memory 1530 through, for example, a bus 1520. Optionally, the electronic device 1500 may further include a transceiver 1540. In actual application, a number of transceivers 1540 is not limited to one and a structure of the electronic device 1500 is not construed as limiting the example.

The processor 1510 may be a data processing device implemented by hardware including a circuit having a physical structure to perform desired operations. For example, the desired operations may include code or instructions included in a program.

For example, the hardware-implemented data processing device may include a microprocessor, a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, a multiprocessor, a central processing unit (CPU), an application-specific integrated circuit (ASIC), a field-programmable gate array (FPGA), a central processing unit (CPU), a controller and an arithmetic logic unit (ALU), a digital signal processor (DSP), a graphics processing unit (GPU), a visual processing unit (VPU), an application processor (AP), a neural processing unit (NPU), or a programmable logic unit (PLU). Further details regarding the processor 1510 is provided below.

The bus 1520 may include a path for transmitting information between components. The bus 1520 may be a peripheral component interconnect (PCI) bus, an extended industry standard architecture (EISA) bus, and the like. The bus 1520 may be divided into an address bus, a data bus, and a control bus. For clarity of description, although a single thick line is used in FIG. 15, it does not indicate that there is only a single bus or bus type.

The memory 1530 implemented as a volatile memory device or a non-volatile memory device. The volatile memory device may be implemented as a dynamic random access memory (DRAM), a static random access memory (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. In an example, the memory 1530 may be any media used to carry or store a desired program code in a form of an instruction or a data structure and accessible by a computer. Further details regarding the memory 1530 is provided below.

The memory 1530 is used to store an application program code for executing the example and is executed under control of the processor 1510. The processor 1510 is used to implement the contents of the examples provided herein by executing the application program code or the computer program stored in the memory 1530.

In the examples provided herein, an object pose estimation method executed by the electronic device 1500 may be executed using an artificial intelligence (AI) model.

The object pose estimation method executed by the electronic device 1500 may acquire output data of an image feature of an image or a recognition image by using image data or video data as input data of the AI model. The AI model may be acquired through training. Here, "acquiring through training" represents acquiring an operating rule or an AI model predefined to perform a desired feature or goal by training a basic AI model based on a plurality of pieces of training data through a training algorithm.

In an example, the AI model may be a neural network or an artificial neural network (ANN) that may generate mapping between input patterns and output patterns, and may have a generalization capability to generate a relatively correct output with respect to an input pattern that has not been used for training. The neural network may refer to a general model that has an ability to solve a problem, where artificial neurons (nodes) forming the network through synaptic combinations change a connection strength of synapses through training.

A neural network includes a plurality of layers, such as an input layer, a plurality of hidden layers, and an output layer. Each layer of the neural network may include a plurality of nodes. Each node may indicate an operation or computation unit having at least one input and output, and the nodes may be connected to one another.

The input layer may include one or more nodes to which data is directly input without being through a connection to another node. The output layer may include one or more output nodes that are not connected to another node. The hidden layers may be the remaining layers of the neural network from which the input layer and the output layer are excluded, and include nodes corresponding to an input node or output node in a relationship with another node. According to examples, the number of hidden layers included in the neural network, the number of nodes included in each layer, and/or a connection between the nodes may vary. A neural network including a plurality of hidden layers may also be referred to as a deep neural network (DNN).

A weight may be set for a connection between nodes of the neural network. For example, a weight may be set for a connection between a node included in the input layer and another node included in a hidden layer. The weight may be adjusted or changed. The weight may determine the influence of a related data value on a final result as it increases, decreases, or maintains the data value.

The neural network may include a convolutional neural network (CNN), a deep neural network (DNN), a recurrent neural network (RNN), a bidirectional recurrent deep neural network (BRDNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), an attention network (AN), and a deep Q-network.

Visual comprehension refers to technology for recognizing a thing such as a vision of a human and processing an object, and includes, for example, target recognition, target tracking, image search, human recognition, scene recognition, 3D reconstruction/positioning, and image enhancement.

The object pose estimation apparatus provided herein may implement at least one of a plurality of components through the AI model. An AI-related function may be performed by a nonvolatile memory, a volatile memory, and a processor, such as the processor 1510 and memory 1530 described above.

The processor may control processing of input data according to the predefined operating rule or AI model stored in the nonvolatile memory and the volatile memory, and provides the predefined operating rule or AI model through training or learning.

Here, "providing through learning" represents acquiring the predefined operating rule or the AI model having a desired feature by applying a learning algorithm to multiple learning data. Corresponding learning may be performed in an apparatus itself in which AI according to the example is performed and/or may be implemented as a separate server/system.

The learning algorithm refers to a method of training a predetermined target device, for example, a robot, based on multiple learning data to determine, predict, or allow the target device. Examples of the learning algorithm include supervised learning, non-supervised learning, semi-supervised learning, and reinforcement learning. However, it is provided as an example only.

The object pose estimation apparatus 1400, the image confidence determiner 1410, the pose estimator 1420, the fusion feature confidence determiner, the image feature confidence determiner, the geometric relationship feature acquirer, the second appearance feature determiner, the initial frame section, the transceiver 1540, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the object pose estimation method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An object pose estimation method, the method comprising:
   determining a confidence of a depth image of an object based on a feature determined based on a color image and the depth image of the object;
   estimating a pose of the object based on a three-dimensional (3D) keypoint in response to the depth image being reliable; and
   estimating the pose of the object based on a two-dimensional (2D) keypoint in response to the depth image being unreliable.

2. The method of claim 1, wherein the determining of the confidence of the depth image comprises:
   extracting an image feature based on the color image or based on the color image and the depth image,
   extracting a point cloud feature based on the depth image,
   acquiring a fusion feature by fusing the image feature and the point cloud feature, and
   determining the confidence of the depth image based on the fusion feature.

3. The method of claim 2, wherein the determining of the confidence of the depth image based on the fusion feature comprises:
   acquiring an object instance segmentation image and a depth confidence image based on the fusion feature; and
   determining the confidence of the depth image corresponding to each target object in the color image based on the object instance segmentation image and the depth confidence image.

4. The method of claim 1, wherein the determining of the confidence of the depth image comprises extracting an image feature based on the color image and the depth image and determining the confidence of the depth image based on the image feature.

5. The method of claim 4, wherein the determining of the confidence of the depth image based on the image feature comprises:
   acquiring an object instance segmentation image and a depth confidence image based on the image feature; and
   determining the confidence of the depth image corresponding to each target object in the color image based on the object instance segmentation image and the depth confidence image.

6. The method of claim 5, wherein the acquiring of the object instance segmentation image and the depth confidence image based on the image feature comprises:
   acquiring a region image feature of an image region corresponding to the each target object based on the image feature; and
   determining a depth confidence image of a target object based on a region image feature corresponding to the target object and acquiring the object instance segmentation image based on the region image feature corresponding to the each target object.

7. The method of claim 1, further comprising:
   acquiring a first appearance feature of each target object and a geometric relationship feature between the respective target objects based on the color image and the depth image; and
   determining a second appearance feature of a target object based on a first appearance feature of the target object, a first appearance feature of another target object, and a geometric relationship feature between the target object and the other target object, with respect to the each target object.

8. The method of claim 7, wherein the estimating of the pose of the object based on the 3D keypoint comprises estimating a pose of the each target object based on a fusion feature and a second appearance feature of the each target object.

9. The method of claim 7, wherein the estimating of the pose of the object based on the 3D keypoint comprises estimating a pose of the each target object based on an image feature and a second appearance feature of the each target object.

10. The method of claim 7, wherein the acquiring of the first appearance feature of the each target object and the geometric relationship feature between the respective target objects based on the color image and the depth image comprises:
    extracting an image feature based on the color image or based on the color image and the depth image, extracting a point cloud feature based on the depth image, acquiring a fusion feature by fusing the image feature and the point cloud feature, acquiring the first appearance feature of the each target object and an object instance segmentation image based on the fusion feature, and acquiring a geometric relationship feature between the respective target objects based on the object instance segmentation image.

11. The method of claim 7, wherein the acquiring of the first appearance feature of the each target object and the geometric relationship feature between the respective target objects based on the color image and the depth image comprises:
    extracting an image feature based on the color image and the depth image, acquiring a region image feature corresponding to an image region of the each target object based on the image feature, acquiring the first appearance feature of the each target object and a corresponding object detection result based on the region image feature corresponding to the image region of the each target object, and acquiring the geometric relationship feature between the respective target objects based on the object detection result of each target object.

12. The method of claim 1, further comprising:
    detecting whether a target object or a target pose first appears in a video frame and determining whether the video frame is an initial frame.

13. The method of claim 12, wherein the detecting of whether the target object or the target pose first appears in the video frame and the determining of whether the video frame is the initial frame comprises:
    acquiring an image bounding box of each target object in a corresponding video frame;
    matching the image bounding box of each target object and an image bounding box corresponding to each object of a pose result list;
    in response to a matching target object being present in the pose result list, comparing first point cloud data of the image bounding box corresponding to each target object in the corresponding video frame and a second point cloud data frame corresponding to each target object in a previous video frame of the corresponding video frame and determining whether a difference is present between the first point cloud data and second point cloud data, and determining that a pose of an object corresponding to the target object first appears, in response to the difference being present; and determining that the target object first appears, in response to the matching target object being absent in the pose result list.

14. The method of claim 12, further comprising:

acquiring a motion parameter corresponding to the video frame and determining a pose result corresponding to the video frame based on the motion parameter and an object pose result of an initial frame corresponding to the video frame, in response to the video frame being a non-initial frame; and updating the object pose result of the initial frame corresponding to the video frame in a pose result list based on the pose result corresponding to the video frame.

15. A non-transitory computer-readable storage medium storing instructions that, when executed by a processor, cause the processor to perform the method of claim 1.

16. An electronic device comprising:

a processor configured to determine a confidence of a depth image of an object based on a feature determined based on a color image and the depth image of the object;

estimate a pose of the object based on a three-dimensional (3D) keypoint in response to the depth image being reliable; and estimate the pose of the object based on a two-dimensional (2D) keypoint in response to the depth image being unreliable.

17. The electronic device of claim 16, wherein the processor is further configured to:

extract an image feature based on the color image or based on the color image and the depth image;

extract a point cloud feature based on the depth image;

acquire a fusion feature by fusing the image feature and the point cloud feature; and determine the confidence of the depth image based on the fusion feature.

18. The electronic device of claim 17, wherein the processor is further configured to:

acquire an object instance segmentation image and a depth confidence image based on the fusion feature; and determine the confidence of the depth image corresponding to each target object in the color image based on the object instance segmentation image and the depth confidence image.

19. The electronic device of claim 16, wherein the processor is further configured to:

detect whether a target object or a target pose first appears in a video frame and to determine whether the video frame is an initial frame.

* * * * *